US012120974B2

(12) United States Patent
Kendall et al.

(10) Patent No.: US 12,120,974 B2
(45) Date of Patent: Oct. 22, 2024

(54) SPREAD CONTROL MECHANISM

(71) Applicant: Earthway Products, Inc., Bristol, IN (US)

(72) Inventors: Jeffrey D. Kendall, Laurel, MD (US); Richard Sevrey, Bristol, IN (US); Richard H. Chapman, Camillus, NY (US)

(73) Assignee: Earthway Products, Inc., Bristol, IN (US)

( * ) Notice: Subject to any disclaimer, the term of this patent is extended or adjusted under 35 U.S.C. 154(b) by 641 days.

(21) Appl. No.: 17/245,193

(22) Filed: Apr. 30, 2021

(65) Prior Publication Data

US 2021/0243944 A1    Aug. 12, 2021
US 2022/0142042 A2    May 12, 2022

Related U.S. Application Data

(63) Continuation of application No. 15/786,064, filed on Oct. 17, 2017, now Pat. No. 10,993,368, which is a
(Continued)

(51) Int. Cl.
*A01C 17/00* (2006.01)
*A01C 15/02* (2006.01)

(52) U.S. Cl.
CPC ............ *A01C 17/008* (2013.01); *A01C 15/02* (2013.01)

(58) Field of Classification Search
CPC ... A01C 17/001; A01C 17/0087; A01C 7/085; A01C 15/02
(Continued)

(56) References Cited

U.S. PATENT DOCUMENTS 332,506 A    12/1885 Eberhart
2,489,171 A    11/1949 Balduf
(Continued)

FOREIGN PATENT DOCUMENTS

CN    103797951 A    2/2017
EP    0176117 A1    1/1991
(Continued)

OTHER PUBLICATIONS

International Search Report for International Patent Application No. PCT/US2015/056203 dated Jan. 11, 2016, 2 pages.
(Continued)

*Primary Examiner* — Cody J Lieuwen
(74) *Attorney, Agent, or Firm* — Hovey Williams LLP; Kameron D. Kelly

(57) ABSTRACT

A broadcast spreader and methods of using the same. One method includes dispersing particulate material using a broadcast spreader having a hopper and an impeller by placing the spreader in a first configuration where a first set of through openings proximate a bottom portion of the hopper permit the particulate material to pass therethrough and fall onto the impeller to thereby be distributed in a first spread pattern, and shifting the spreader into a second configuration where a second set of through openings proximate the bottom portion of the hopper permit the particulate material to pass therethrough and fall onto the impeller to thereby be distributed in a second spread pattern. The first set of through openings includes a different number of through openings than the second set of through openings, and the first spread pattern is different than the second spread pattern.

27 Claims, 22 Drawing Sheets

Related U.S. Application Data continuation of application No. 14/886,183, filed on Oct. 19, 2015, now Pat. No. 9,820,430, which is a continuation-in-part of application No. 14/875,056, filed on Oct. 5, 2015, now Pat. No. 10,225,976, which is a continuation of application No. 13/919,682, filed on Jun. 17, 2013, now Pat. No. 9,198,345, which is a continuation of application No. 13/661,620, filed on Oct. 26, 2012, now Pat. No. 9,192,094.

(60) Provisional application No. 62/066,621, filed on Oct. 21, 2014, provisional application No. 61/552,030, filed on Oct. 27, 2011.

(58) Field of Classification Search
USPC ................................ 239/665, 666, 685, 687
See application file for complete search history.

(56) References Cited

U.S. PATENT DOCUMENTS

| | | | |
|---|---|---|---|
| 2,687,307 A | | 8/1954 | Austermiller |
| 3,383,055 A | | 5/1968 | Speicher |
| 3,682,395 A | | 8/1972 | van der Lely et al. |
| 3,738,546 A | | 6/1973 | Speicher |
| 3,899,138 A | * | 8/1975 | van der Lely ........ E01C 19/203 222/627 |
| 3,944,137 A | | 3/1976 | Cutchins et al. |
| 4,106,704 A | | 8/1978 | McRoskey et al. |
| 4,135,560 A | | 1/1979 | Eang et al. |
| 4,136,804 A | | 1/1979 | Kinzler et al. |
| 4,381,080 A | | 4/1983 | van der Lely et al. |
| 4,469,210 A | | 9/1984 | Blumer |
| 4,479,608 A | | 10/1984 | Martin |
| 4,487,370 A | | 12/1984 | Speicher |
| 4,511,090 A | | 4/1985 | Morgan |
| 4,548,362 A | | 10/1985 | Doering |
| 4,597,531 A | * | 7/1986 | Kise ........ A01C 15/02 239/685 |
| 4,609,153 A | * | 9/1986 | van der Lely ....... A01C 17/005 239/665 |
| 4,776,519 A | | 10/1988 | Zweegers |
| 4,785,976 A | * | 11/1988 | Bennie ............. A01C 15/16 239/665 |
| 4,867,381 A | | 9/1989 | Speicher |
| 4,991,781 A | | 2/1991 | Barbieri |
| 5,145,116 A | | 9/1992 | Shaver |
| 5,203,510 A | | 4/1993 | Courtney et al. |
| 5,244,129 A | | 9/1993 | Poussin et al. |
| 5,285,971 A | | 2/1994 | Havlovitz |
| 5,287,999 A | | 2/1994 | Olsen |
| 5,340,033 A | | 8/1994 | Whitell |
| 5,533,677 A | | 7/1996 | McCaffrey |
| 5,626,260 A | | 5/1997 | Waldner |
| 5,842,648 A | | 12/1998 | Havlovitz et al. |
| 6,047,909 A | | 4/2000 | Simpson |
| 6,116,526 A | | 9/2000 | Bom et al. |
| 6,138,927 A | | 10/2000 | Spear et al. |
| 6,354,320 B1 | | 3/2002 | Kolacz |
| 6,499,679 B1 | | 12/2002 | Woodruff et al. |
| 6,588,685 B2 | | 7/2003 | Woodruff et al. |
| 6,616,074 B2 | | 9/2003 | Courtney et al. |
| 6,907,832 B2 | | 6/2005 | Wyne |
| 6,921,037 B2 | | 7/2005 | Wysong et al. |
| 6,945,481 B2 | | 9/2005 | Thompson et al. |
| 7,063,280 B1 | * | 6/2006 | Bogart ................ A01C 17/008 239/681 |
| 7,380,734 B2 | | 6/2008 | Magnusson |
| 7,380,735 B2 | | 6/2008 | Hayward et al. |
| 7,837,073 B2 | | 11/2010 | Havlovitz et al. |
| 8,056,838 B2 | | 11/2011 | Conner et al. |
| 8,066,206 B1 | | 11/2011 | Cotham |
| 8,757,521 B2 | | 6/2014 | Cichy et al. |
| D729,849 S | | 5/2015 | Kendall et al. |
| D729,850 S | | 5/2015 | Kendall et al. |
| D730,410 S | | 5/2015 | Kendall |
| 9,038,861 B2 | * | 5/2015 | Renyer ................ B65D 88/54 222/452 |
| 9,192,094 B2 | | 11/2015 | Kendall et al. |
| 2002/0014545 A1 | * | 2/2002 | Woodruff ............ A01C 17/006 239/685 |
| 2003/0192968 A1 | | 10/2003 | Courtney |
| 2006/0157518 A1 | | 7/2006 | Havlovitz et al. |
| 2008/0216918 A1 | | 9/2008 | Comardo et al. |
| 2009/0136325 A1 | | 5/2009 | Widmer |
| 2010/0326035 A1 | | 12/2010 | Schrattenecker |
| 2011/0008220 A1 | | 1/2011 | Fleming et al. |
| 2011/0309170 A1 | | 12/2011 | Weeks |
| 2012/0018546 A1 | | 1/2012 | Conner et al. |
| 2013/0105592 A1 | | 5/2013 | Kendall et al. |
| 2018/0106382 A1 | * | 4/2018 | Dubiel ................ A01C 15/06 |

FOREIGN PATENT DOCUMENTS

| | | |
|---|---|---|
| EP | 0540889 B2 | 7/1998 |
| EP | 0982223 A2 | 8/1999 |
| FR | 1178177 A | 5/1959 |
| JP | 4008635 B2 | 11/2007 |
| JP | 6253144 B2 | 7/2015 |
| KR | 20100103281 A | 9/2010 |
| WO | 1983000978 A1 | 3/1983 |

OTHER PUBLICATIONS

Written Opinion of the International Searching Authority for International Patent Application No. PCT/US2015/056203, dated Jan. 11, 2016, 5 pages.

Non-final Office Action dated Sep. 27, 2023 for related U.S. Appl. No. 18/356,149, filed Jul. 20, 2023, 26 pages.

Response filed Dec. 26, 2023 to non-final Office Action dated Sep. 27, 2023 for related U.S. Appl. No. 18/356,149, filed Jul. 20, 2023, 15 pages.

Final Office Action dated Jan. 30, 2024 for related U.S. Appl. No. 18/356,149, filed Jul. 20, 2023, 19 pages.

* cited by examiner

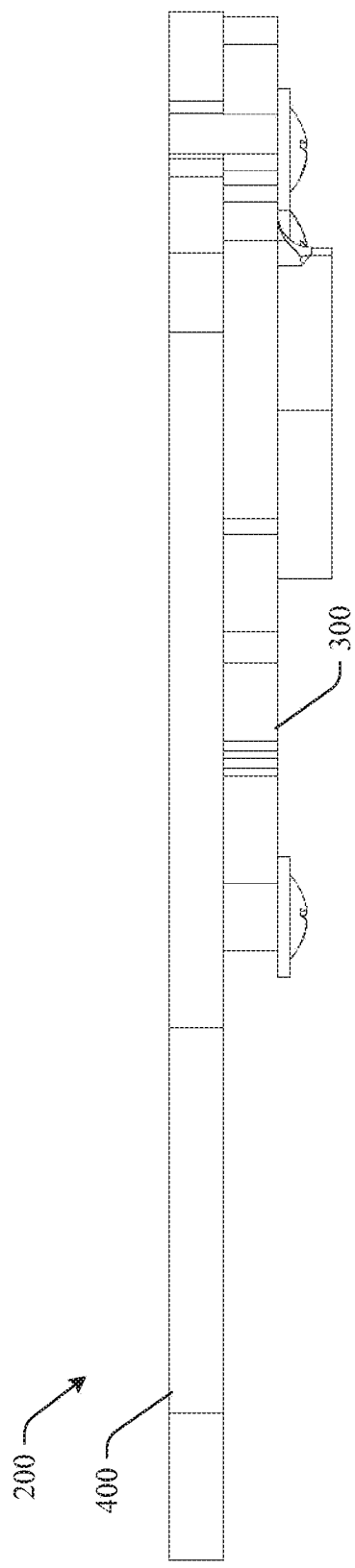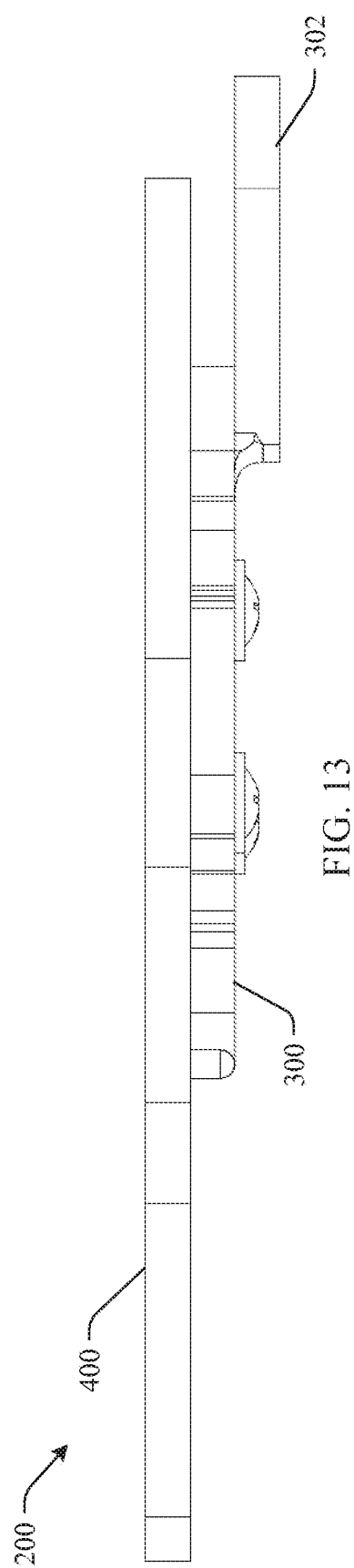

SPREAD CONTROL MECHANISM

CROSS REFERENCE TO RELATED APPLICATIONS

This application is a continuation of U.S. patent application Ser. No. 15/786,064, entitled "SPREAD CONTROL MECHANISM," filed on Oct. 17, 2017; which is a continuation of U.S. patent application Ser. No. 14/886,183, entitled "SPREAD CONTROL MECHANISM," filed on Oct. 19, 2015, and issued on Nov. 21, 2017 as U.S. Pat. No. 9,820,430; which claims the benefit of U.S. Provisional Patent Application Ser. No. 62/066,621, entitled "SPREAD CONTROL MECHANISM," filed on Oct. 21, 2014. U.S. patent application Ser. No. 14/886,183 is also a continuation-in-part of U.S. patent application Ser. No. 14/875,056, entitled "ADAPTABLE SPREADER," filed on Oct. 5, 2015, and issued on Mar. 12, 2019 as U.S. Pat. No. 10,225,976; which is a continuation of U.S. patent application Ser. No. 13/919,682, entitled "ADAPTABLE SPREADER," filed on Jun. 17, 2013, and issued on Dec. 1, 2015 as U.S. Pat. No. 9,198,345; which is a continuation of U.S. patent application Ser. No. 13/661,620, entitled "ADAPTABLE SPREADER," filed on Oct. 26, 2012, and issued on Nov. 24, 2015 as U.S. Pat. No. 9,192,094; which claims the benefit of U.S. Provisional Patent Application Ser. No. 61/552,030, entitled "ADAPTABLE SPREADER," filed on Oct. 27, 2011. The entirety of the above-noted applications are incorporated by reference herein.

ORIGIN

The innovation disclosed herein relates to a particulate dispersing apparatus and, more specifically, to a granular spreader having a spread control mechanism.

BACKGROUND

A known particulate spreader incorporates a deflector that when activated impedes particulate material from exiting out one side of the spreader. Thus, any material dispersed in the spread pattern is impeded from spreading onto non-lawn areas, such as landscape beds, driveways, walkways, etc. In other words, the deflector simply deflects the dispensed material back toward the lawn area. A disadvantage of material dispersing systems that rely on such a deflector is that the amount of material dispersed (material flow rate) into the spread pattern remains the same whether or not a deflector is activated. Thus, if the deflector is activated the amount of material directed onto the lawn is more than the recommended amount since the deflected material also exits the side of the spreader opposite that of the deflector. This leads to over treatment of the lawn and to wasted product.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

Some embodiments are directed to a method of dispersing particulate material using a broadcast spreader having a hopper and an impeller disposed below the hopper. The method includes placing the broadcast spreader in a first configuration where a first set of one or more through openings proximate a bottom portion of the hopper permit the particulate material to pass therethrough and fall onto the impeller to thereby be distributed in a first spread pattern during use of the broadcast spreader. The method also includes shifting the broadcast spreader into a second configuration where a second set of one or more through openings proximate the bottom portion of the hopper permit the particulate material to pass therethrough and fall onto the impeller to thereby be distributed in a second spread pattern during use of the broadcast spreader. The first set of one or more through openings includes a different number of through openings than the second set of one or more through openings, and the first spread pattern is different than the second spread pattern.

Other embodiments are directed to a method of dispersing particulate material using a broadcast spreader including a hopper and an impeller that disperses particulate material falling thereon from the hopper. The method includes operating the broadcast spreader in a first configuration by providing a first set of one or more through openings proximate a bottom portion of the hopper resulting in a first spread pattern. The method also includes operating the broadcast spreader in a second configuration by providing a second set of one or more through openings proximate a bottom portion of the hopper resulting in a second spread pattern. The number of through openings included in the first set of one or more through openings is different than a number of through openings included in the second set of one or more through openings, and the first spread pattern is different than the second spread pattern.

Still other embodiments are directed to a broadcast spreader that operates in multiple configurations thereby providing multiple spread patterns. The broadcast spreader includes an impeller and a hopper disposed above the impeller that drops particulate material onto the impeller. When the broadcast spreader is in a first configuration, the broadcast spreader includes a first set of one or more through openings proximate a bottom portion of the hopper such that, during use of the broadcast spreader in the first configuration, the particulate material is configured to pass through the first set of one or more through openings and fall onto the impeller to thereby be distributed in a first spread pattern. And when the broadcast spreader is in a second configuration, the broadcast spreader includes a second set of one or more through openings proximate a bottom portion of the hopper such that, during use of the broadcast spreader in the second configuration, the particulate material is configured to pass through the second set of one or more through openings and fall onto the impeller to thereby be distributed in a second spread pattern. The first set of one or more through openings includes a different number of openings than the second set of one or more through openings, and the first spread pattern is different than the second spread pattern.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 12 is a left side view of the innovative spread control assembly in an activated position in accordance with an aspect of the innovation.

FIG. 13 is a right side view of the innovative spread control assembly in an activated position in accordance with an aspect of the innovation.

DETAILED DESCRIPTION

Figure 1A:
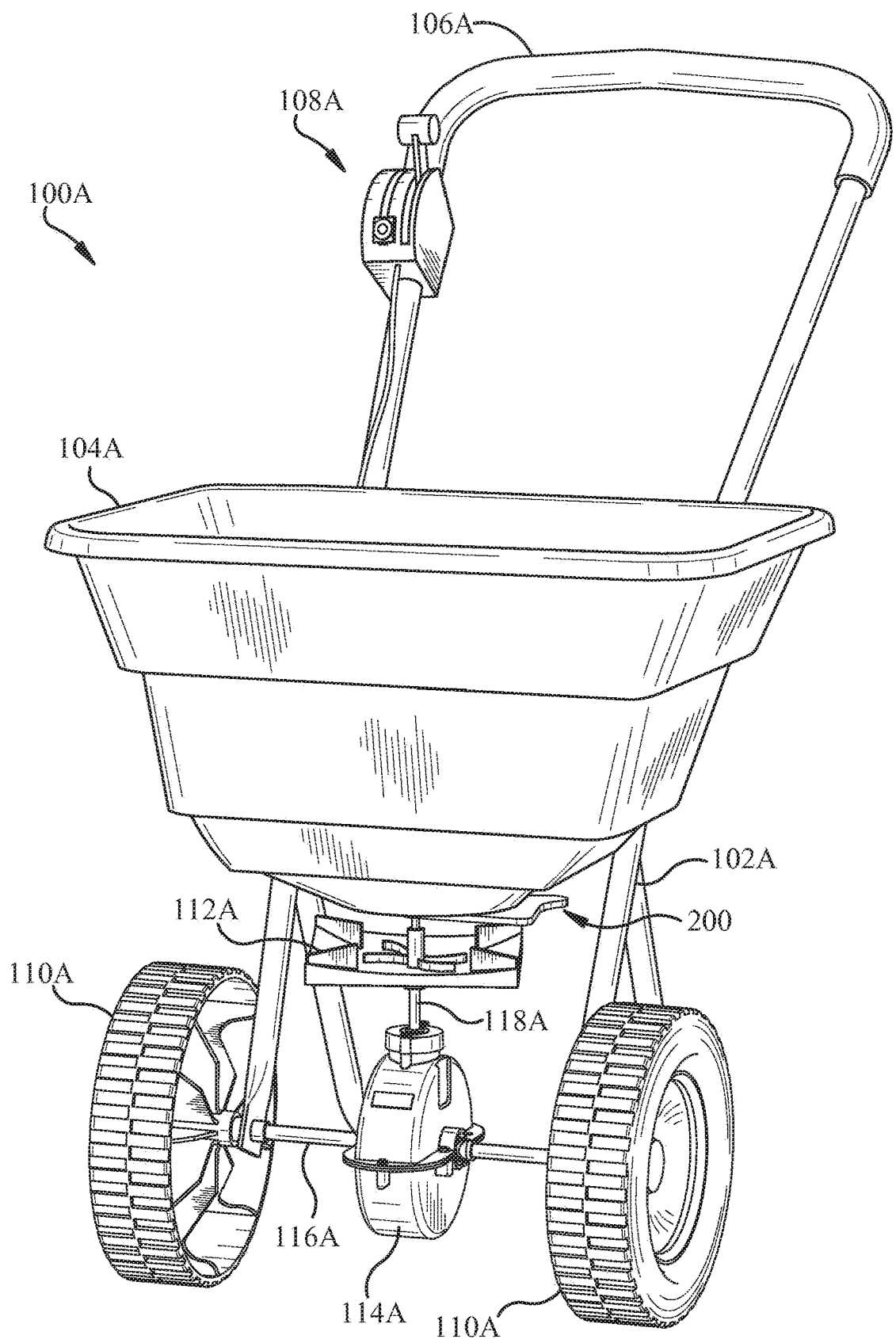
FIG. 1A is a perspective view of an example particulate dispensing apparatus featuring the innovation disclosed herein in accordance with the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein (e.g., thickness), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Disclosed herein is an innovative spread control assembly for use on a particulate dispersing apparatus that when activated impedes particulate material from being dispersed out one side of the particulate apparatus in accordance with an aspect of the innovation. When activated, the assembly overcomes the aforementioned disadvantage by simultaneously regulating a material flow rate of the particulate material, which impedes over treatment of the lawn and wasted material. Thus, the spread control assembly facilitates the reduction of particulate material that is dispersed onto non-lawn areas (e.g., landscape beds, driveways, etc.) while simultaneously regulating the material flow rate.

Figure 1B:
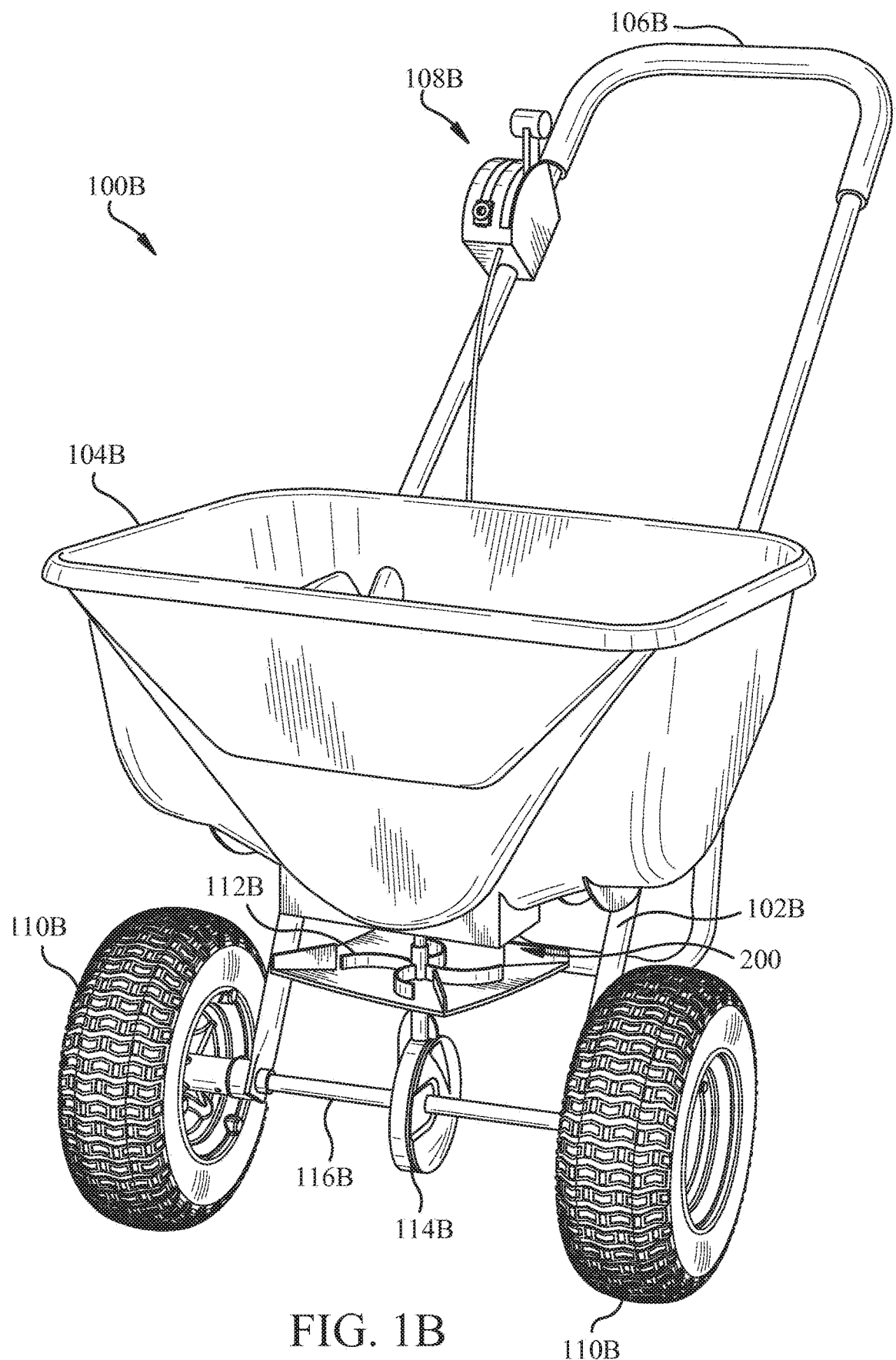
FIG. 1B is a perspective view of another example particulate dispensing apparatus featuring the innovation disclosed herein in accordance with the innovation.
Figure 2:
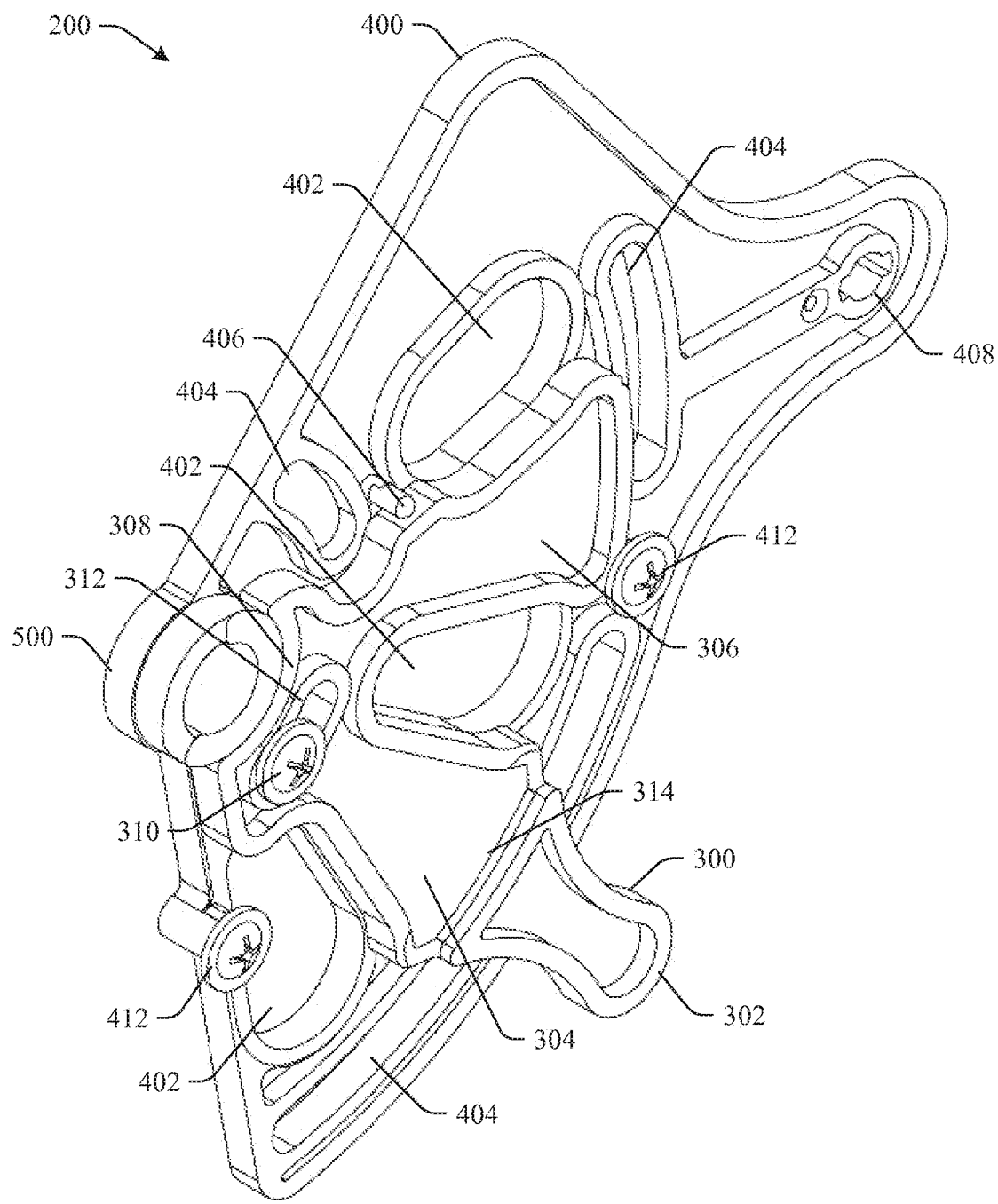
FIG. 2 is a bottom perspective view of an innovative spread control assembly in a deactivated position in accordance with an aspect of the innovation.
Figure 3:
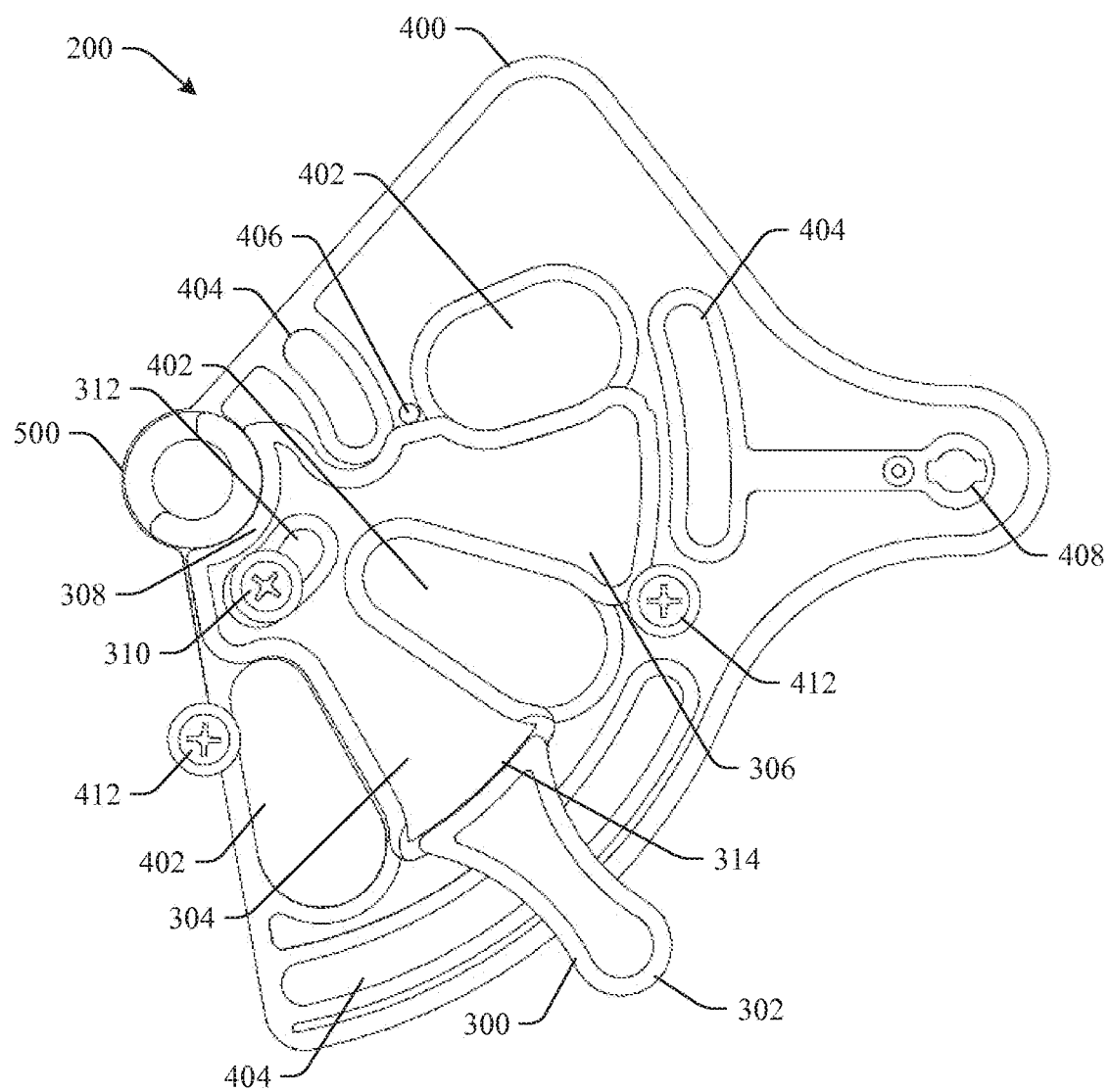
FIG. 3 is a bottom view of the innovative spread control assembly in a deactivated position in accordance with an aspect of the innovation.
Figure 4:
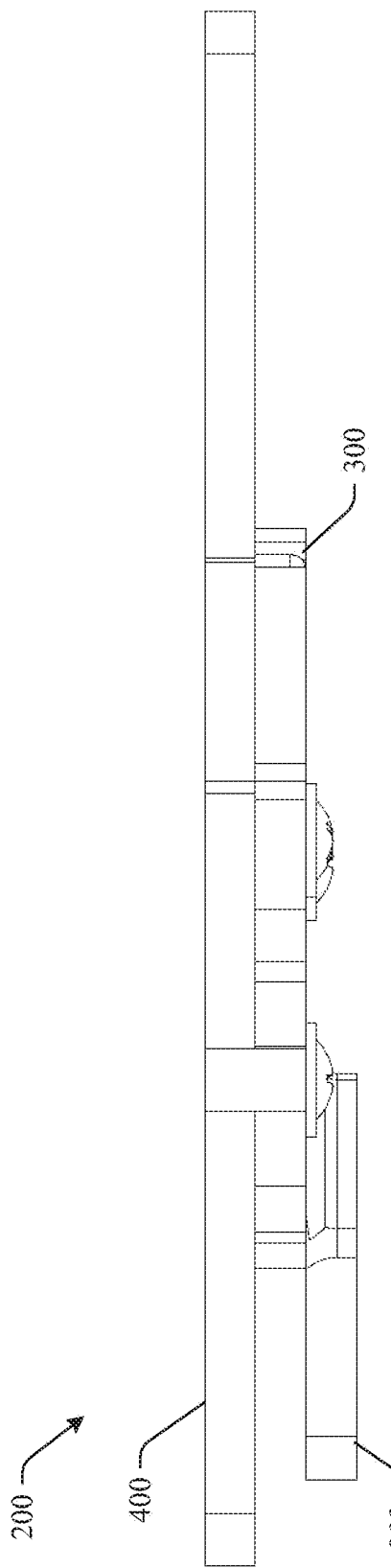
FIG. 4 is a front view of the innovative spread control assembly in a deactivated position in accordance with an aspect of the innovation.
Figure 5:
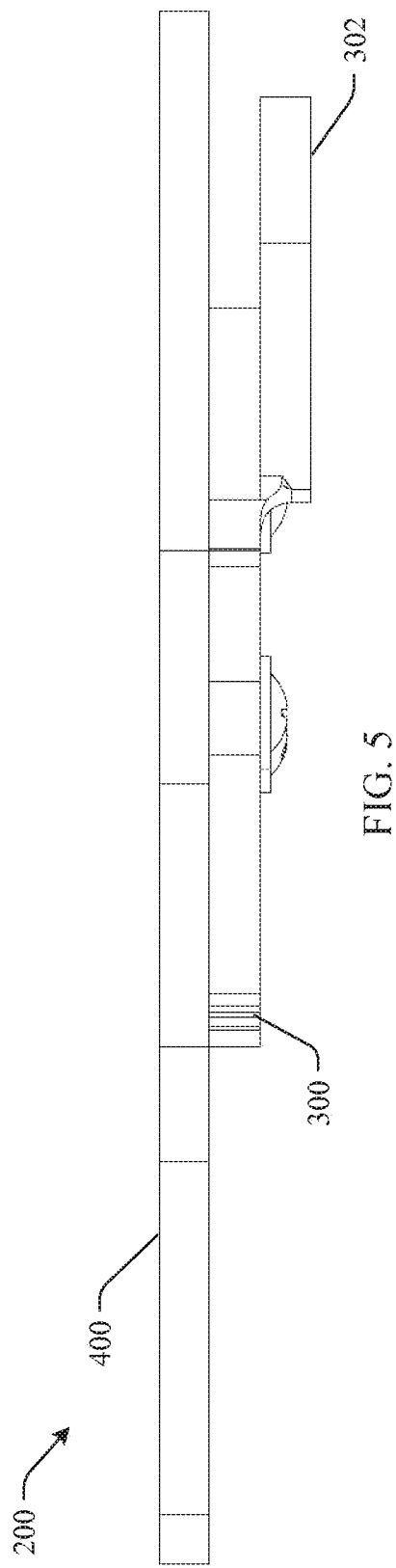
FIG. 5 is a rear view of the innovative spread control assembly in a deactivated position in accordance with an aspect of the innovation.
Figure 6:
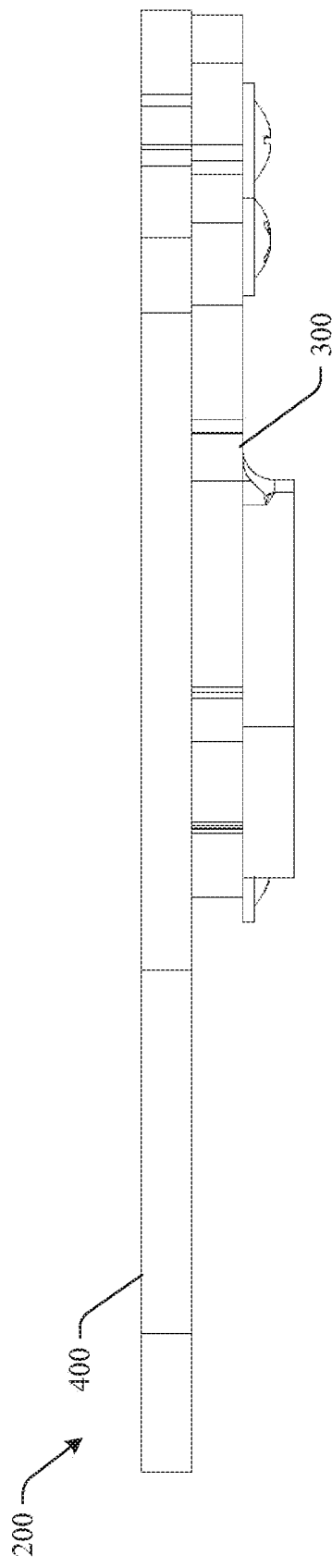
FIG. 6 is a left side view of the innovative spread control assembly in a deactivated position in accordance with an aspect of the innovation.
Figure 7:
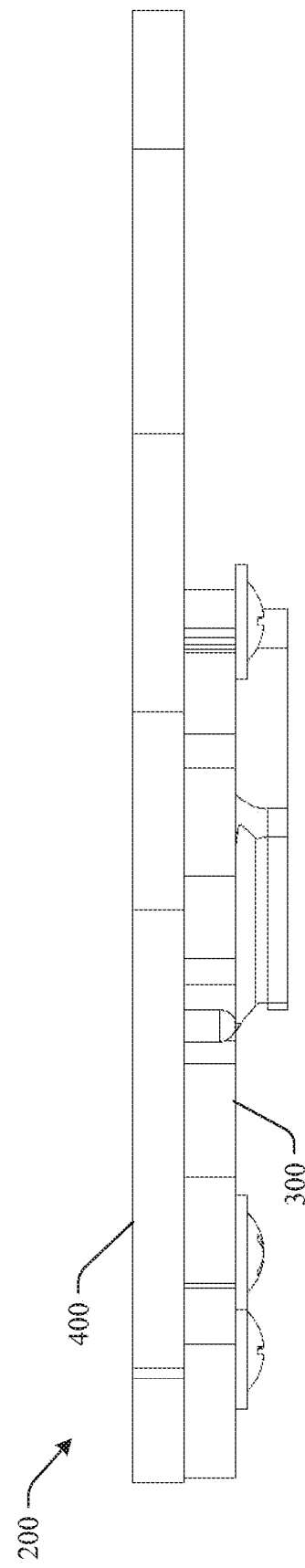
FIG. 7 is a right side view of the innovative spread control assembly in a deactivated position in accordance with an aspect of the innovation.
Figure 8:
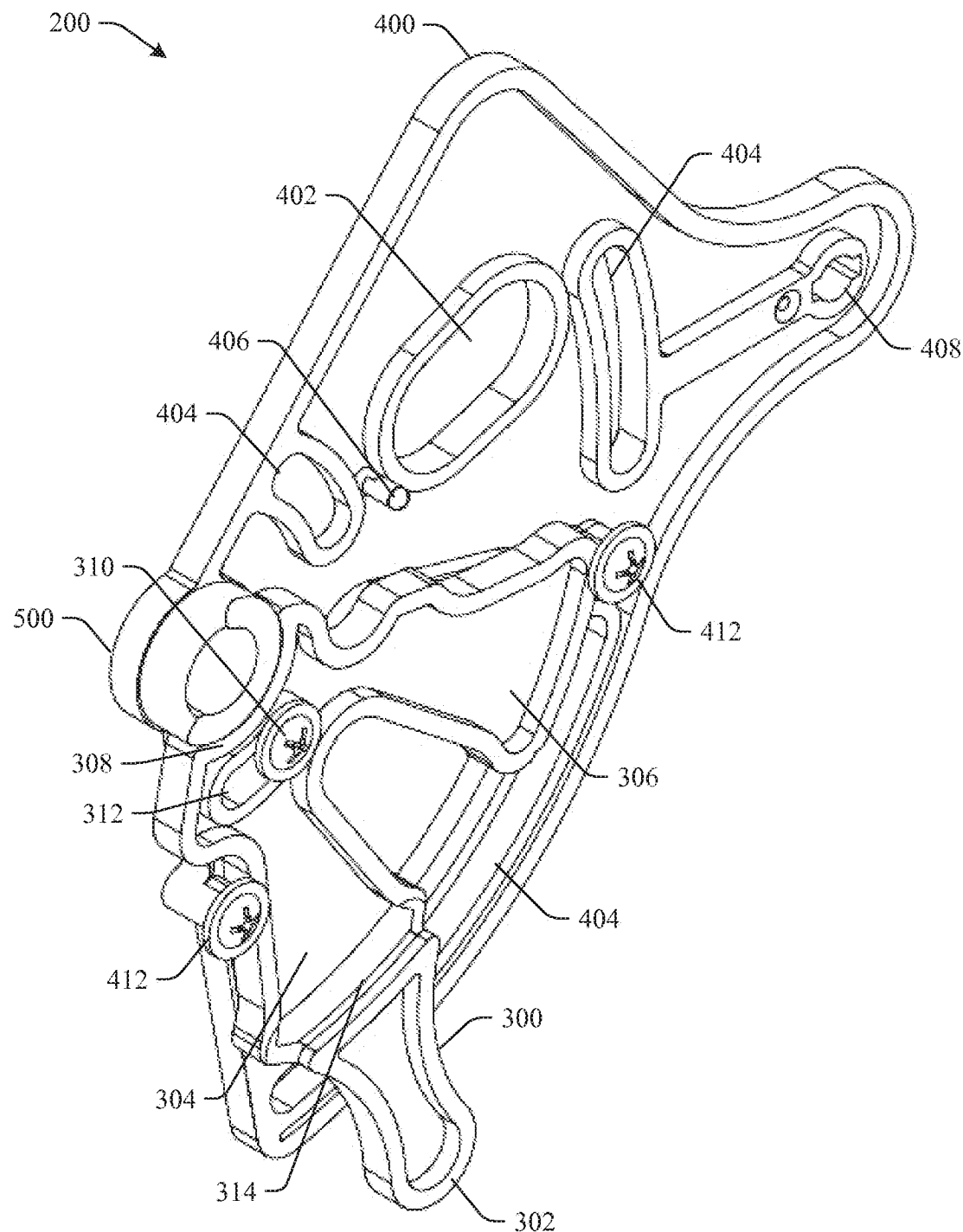
FIG. 8 is a bottom perspective view of the innovative spread control assembly in an activated position in accordance with an aspect of the innovation.
Figure 9:
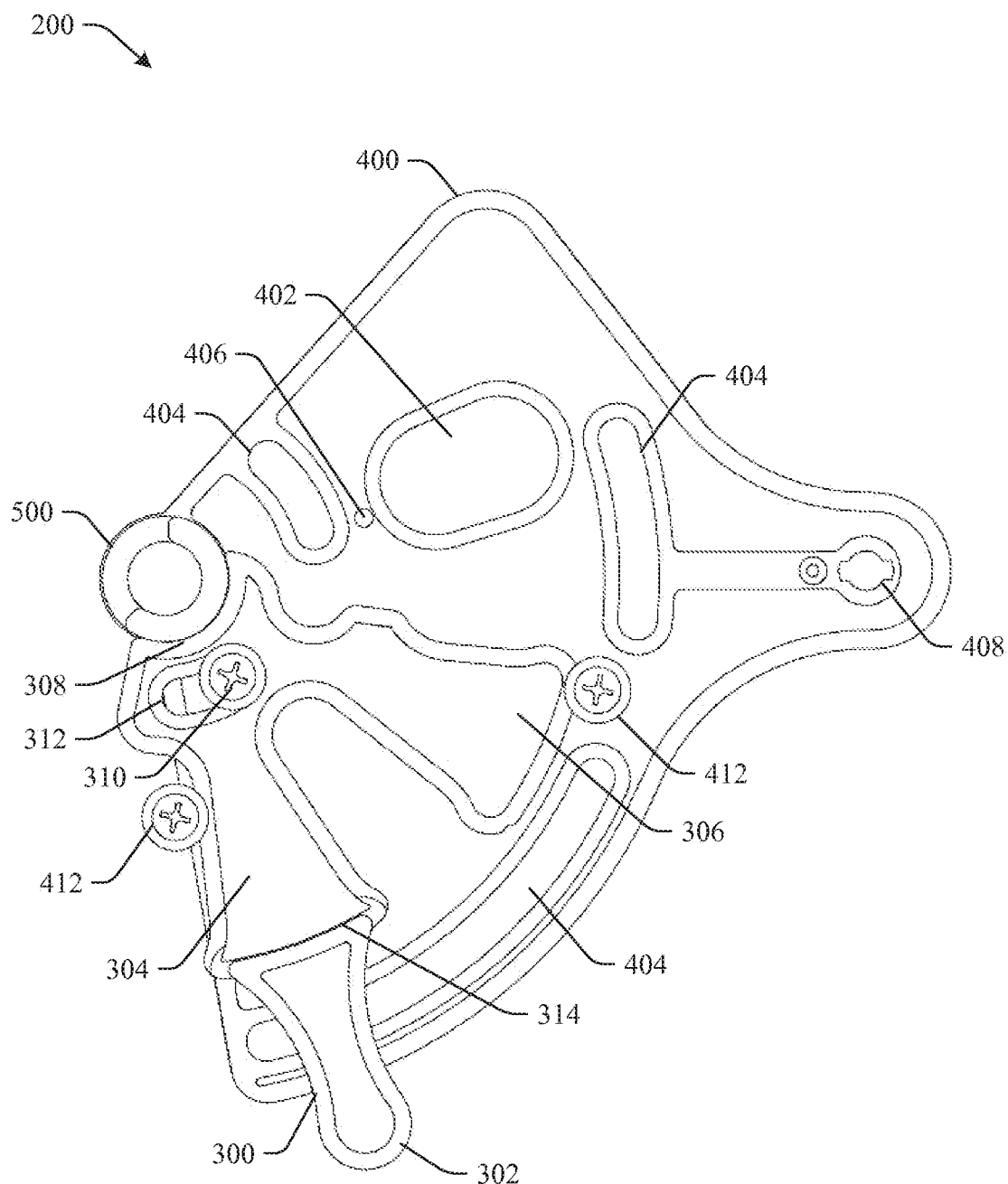
FIG. 9 is a bottom view of the innovative spread control assembly in an activated position in accordance with an aspect of the innovation.
Figure 10:
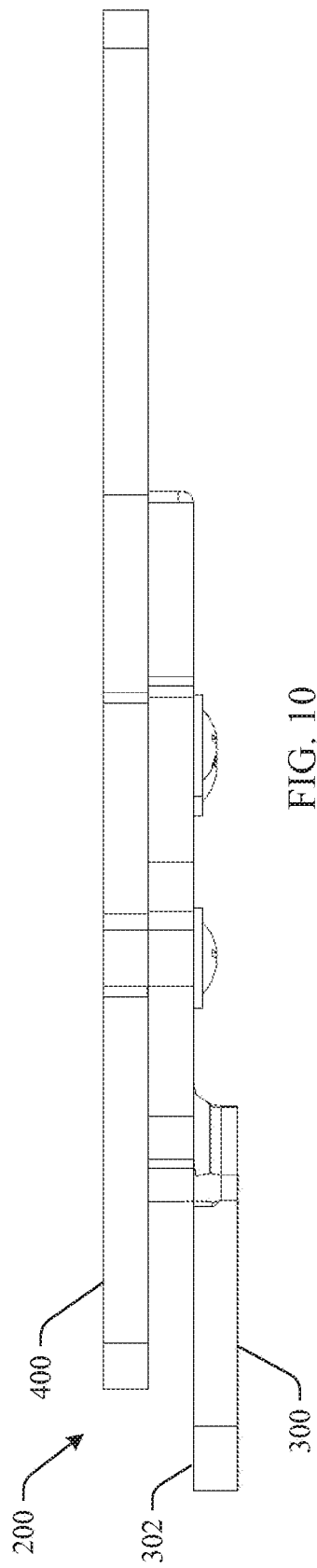
FIG. 10 is a front view of the innovative spread control assembly in an activated position in accordance with an aspect of the innovation.
Figure 11:
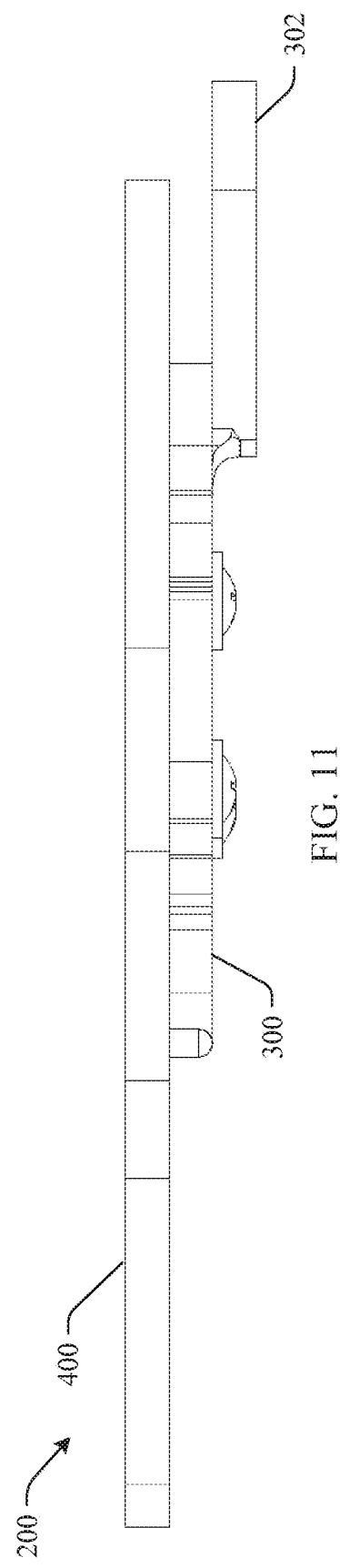
FIG. 11 is a rear view of the innovative spread control assembly in an activated position in accordance with an aspect of the innovation.
Figure 14:
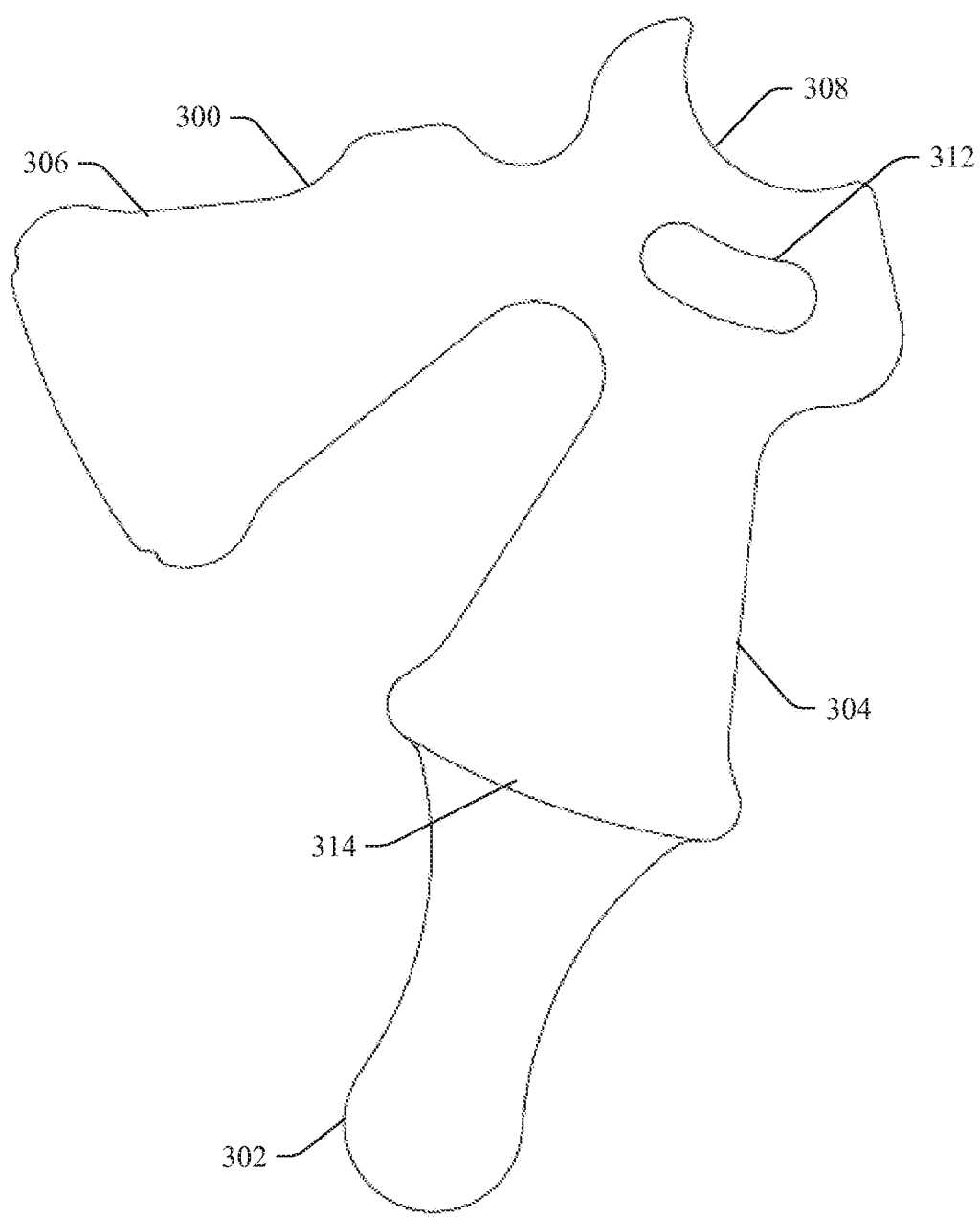
FIG. 14 is a top view of an innovative spread control mechanism in accordance with an aspect of the innovation.
Figure 15:
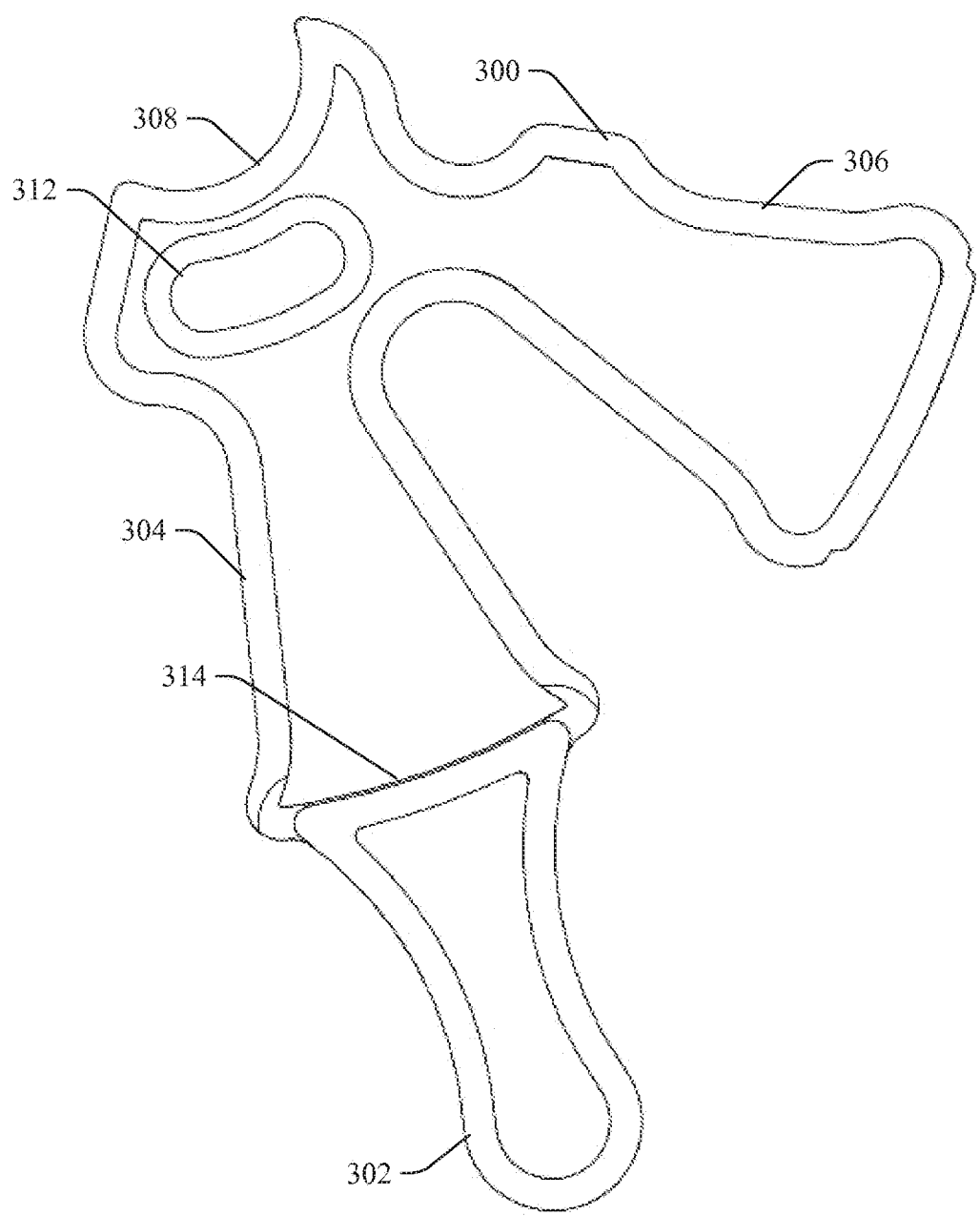
FIG. 15 is a bottom view of the innovative spread control mechanism in accordance with an aspect of the innovation.
Figure 16:
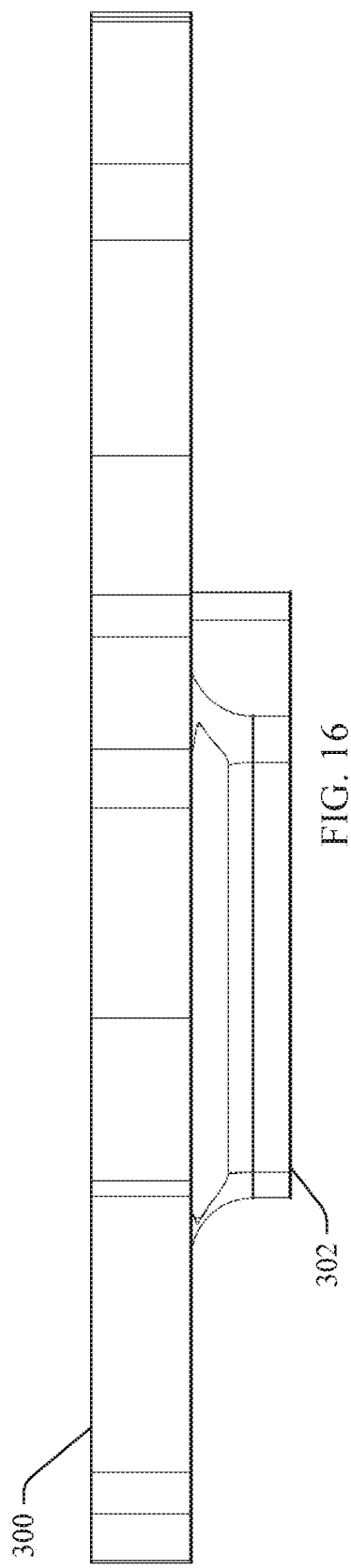
FIG. 16 is a front view of the innovative spread control mechanism in accordance with an aspect of the innovation.
Figure 17:
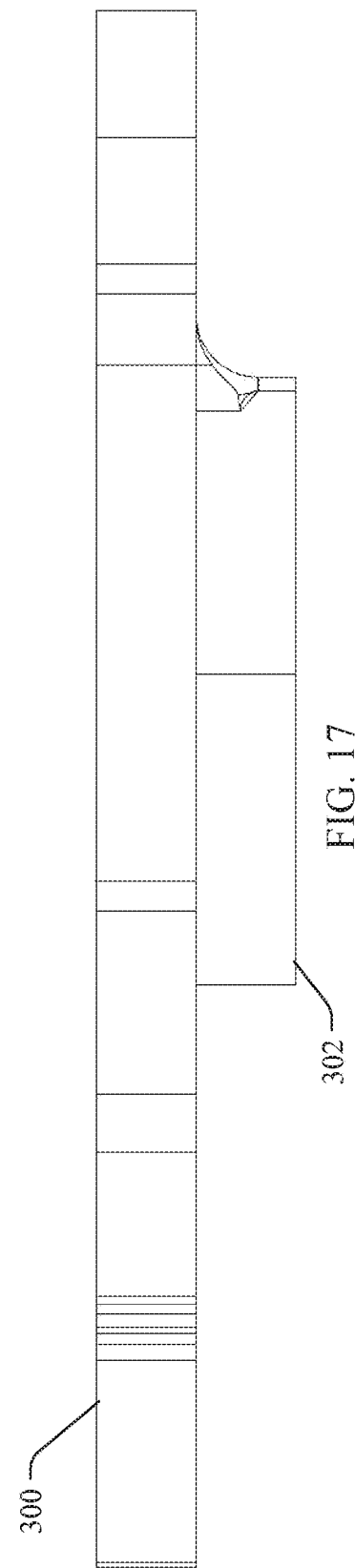
FIG. 17 is a rear view of the innovative spread control mechanism in accordance with an aspect of the innovation.
Figure 18:
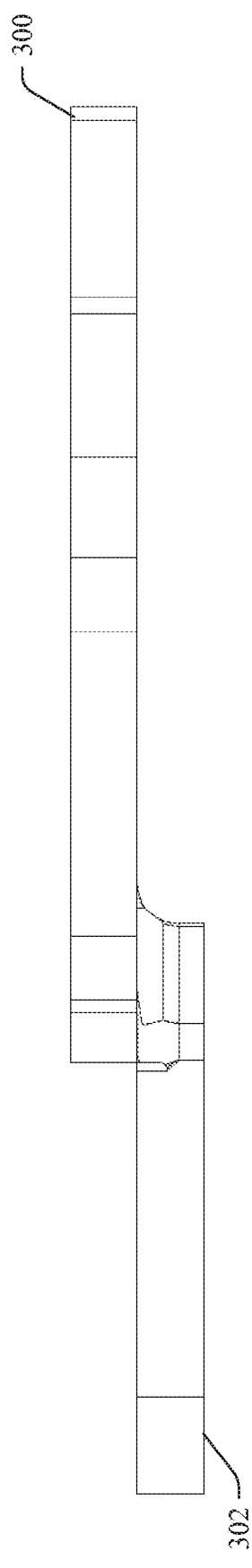
FIG. 18 is a left side view of the innovative spread control mechanism in accordance with an aspect of the innovation.
Figure 19:
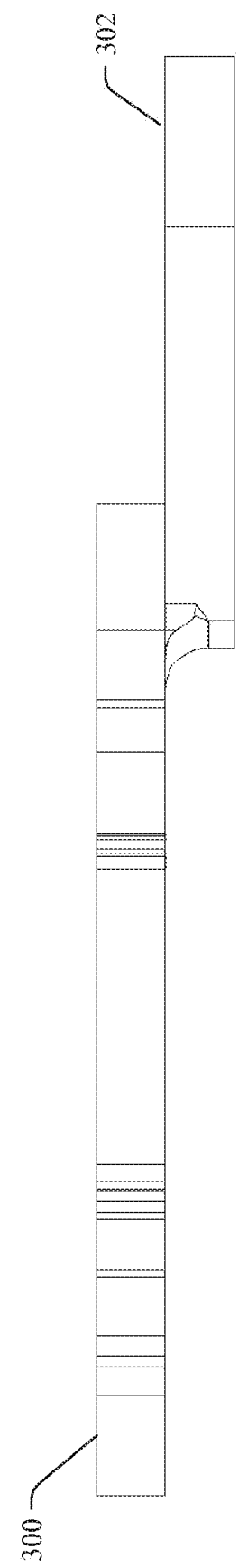
FIG. 19 is a right side view of the innovative spread control mechanism in accordance with an aspect of the innovation.
Figure 20:
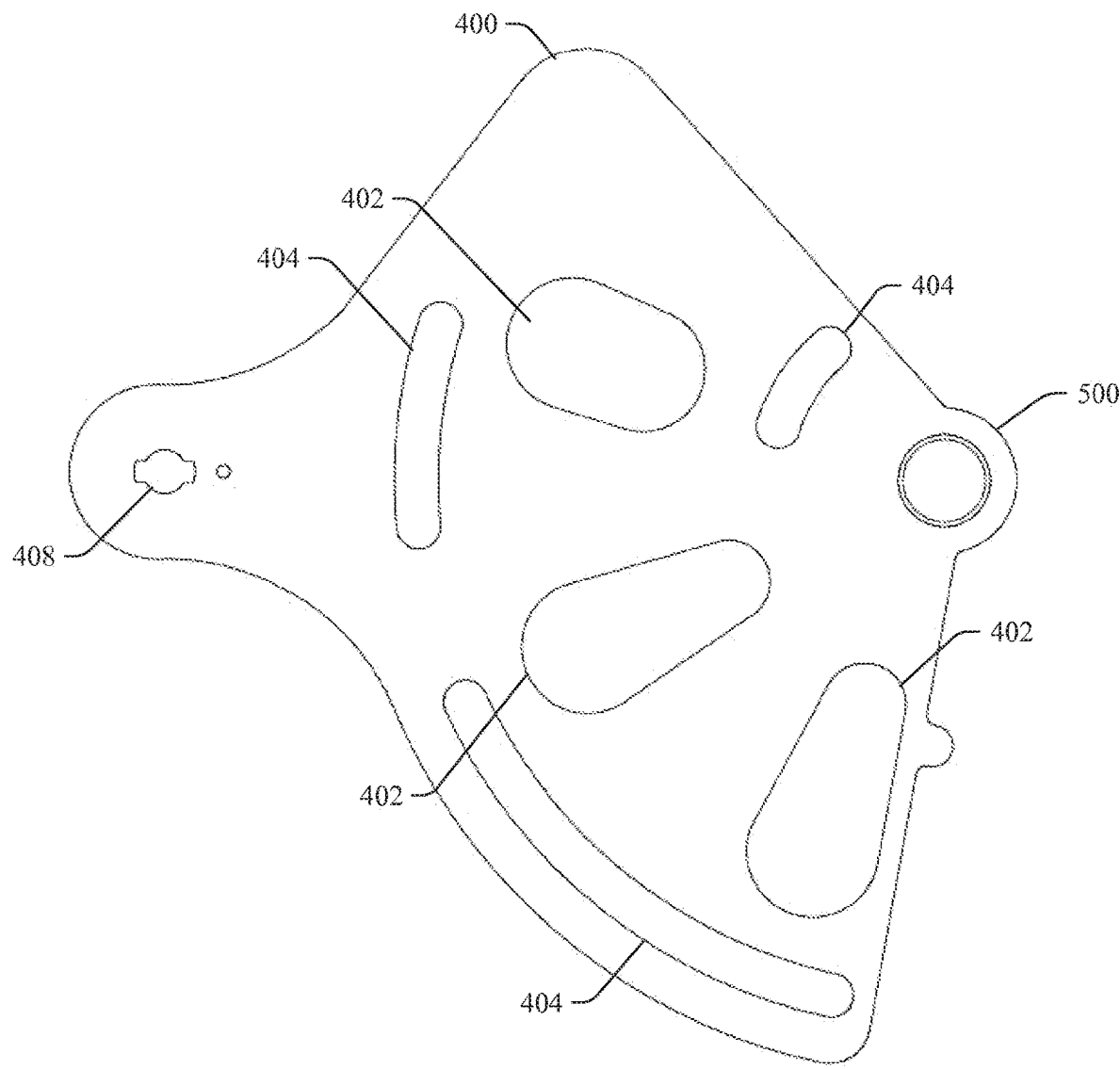
FIG. 20 is a top view of an innovative shut-off adjustment plate in accordance with an aspect of the innovation.
Figure 21:
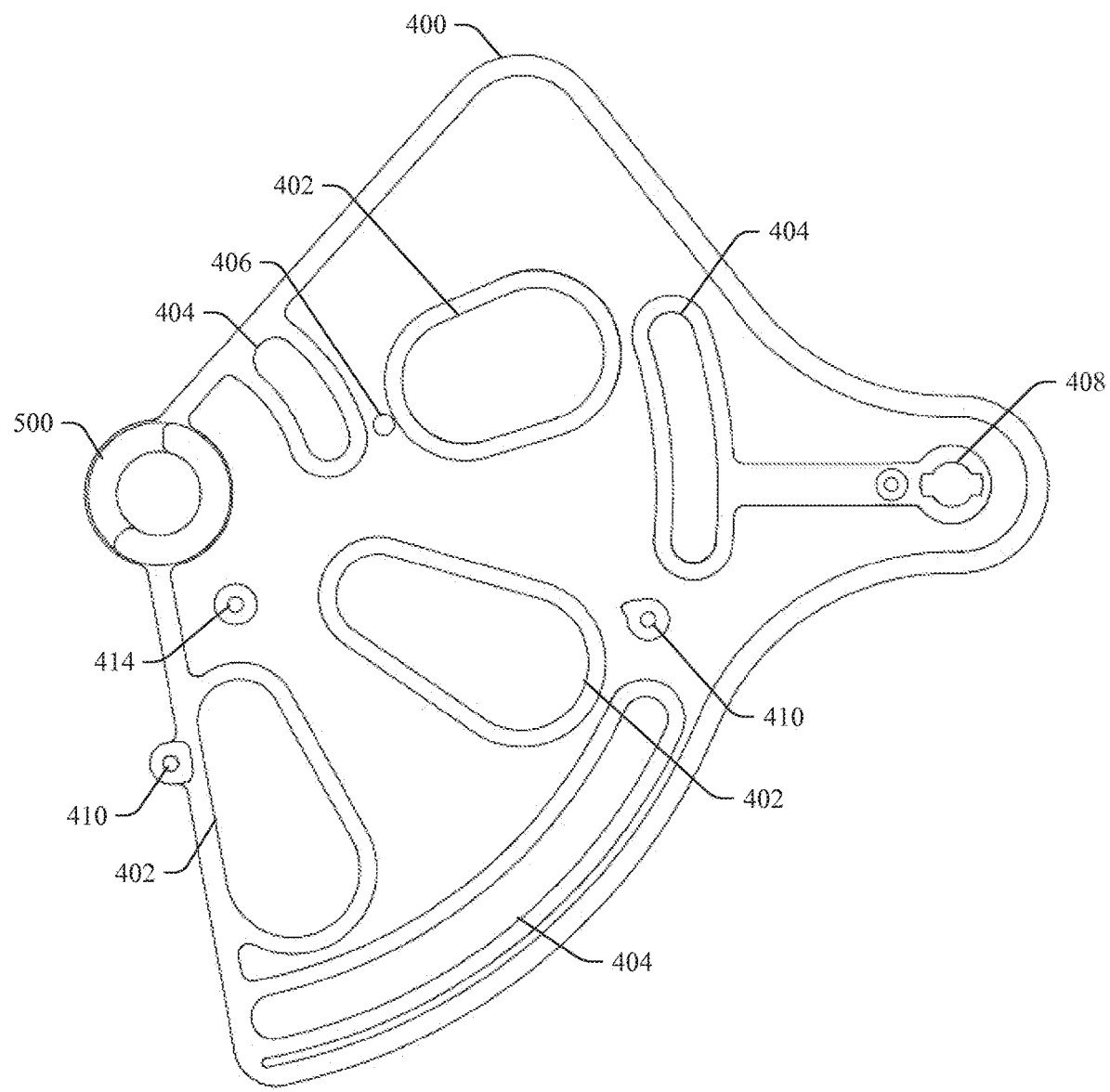
FIG. 21 is a bottom view of the innovative shut-off adjustment plate in accordance with an aspect of the innovation.
Figure 22:
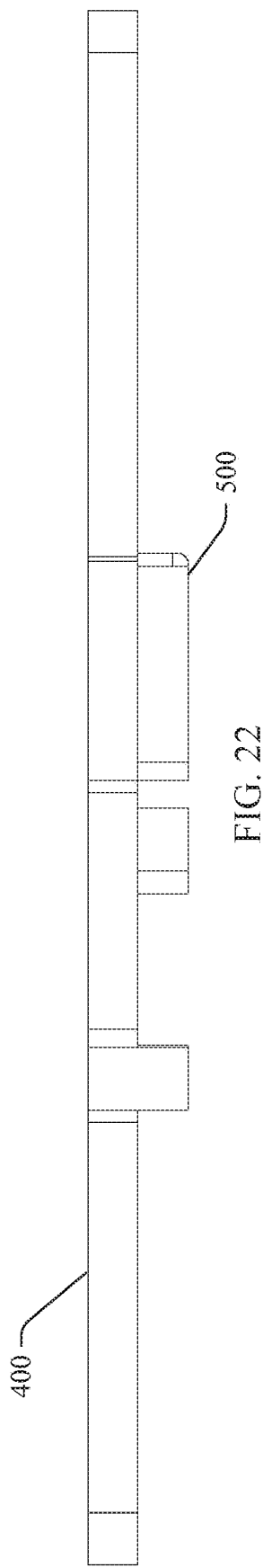
FIG. 22 is a front view of the innovative shut-off adjustment plate in accordance with an aspect of the innovation.
Figure 23:
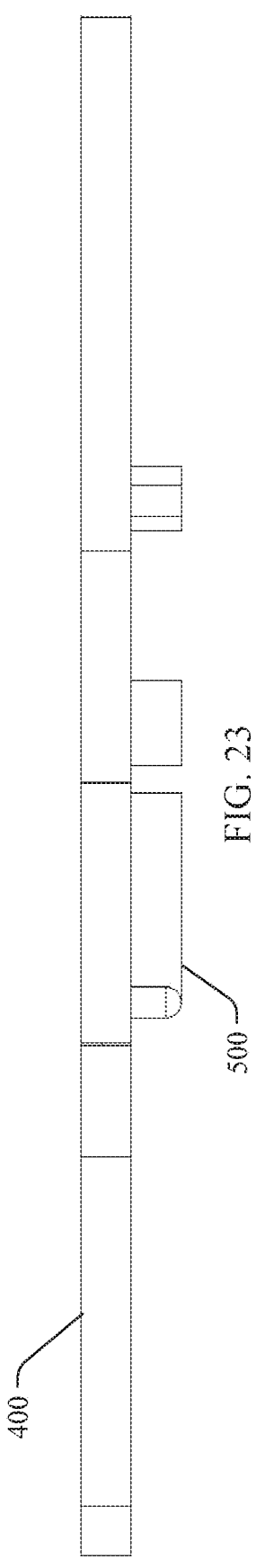
FIG. 23 is a rear view of the innovative shut-off adjustment plate in accordance with an aspect of the innovation.
Figure 24:
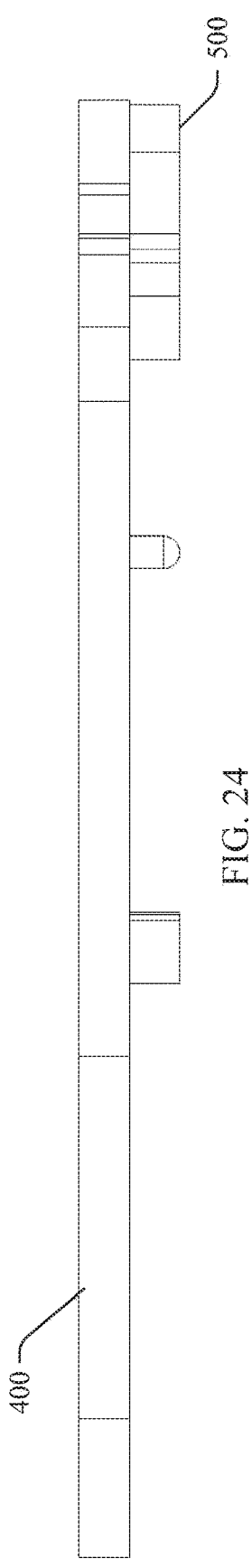
FIG. 24 is a left side view of the innovative shut-off adjustment plate in accordance with an aspect of the innovation.
Figure 25:
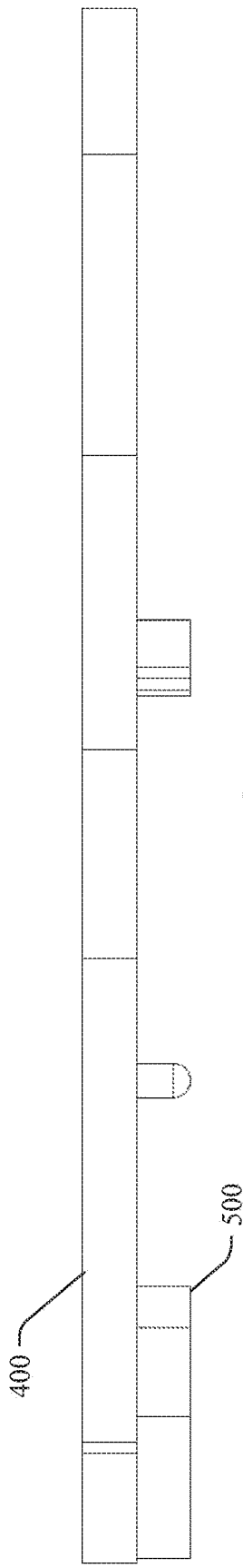
FIG. 25 is a right side view of the innovative shut-off adjustment plate in accordance with an aspect of the innovation.
Figure 26:
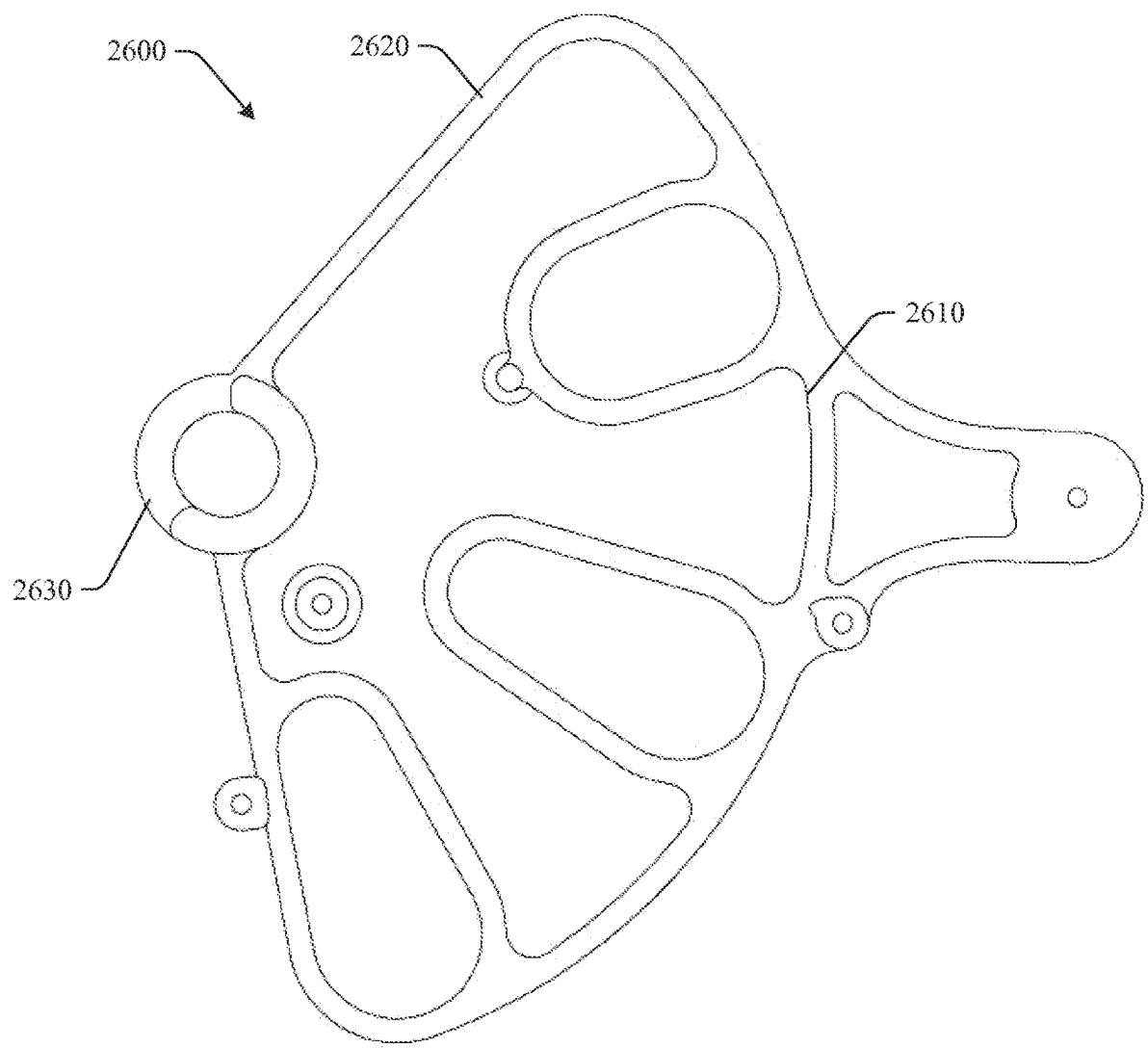
FIG. 26 is another example embodiment of an innovative spread control mechanism in accordance with an aspect of the innovation.
Figure 27:
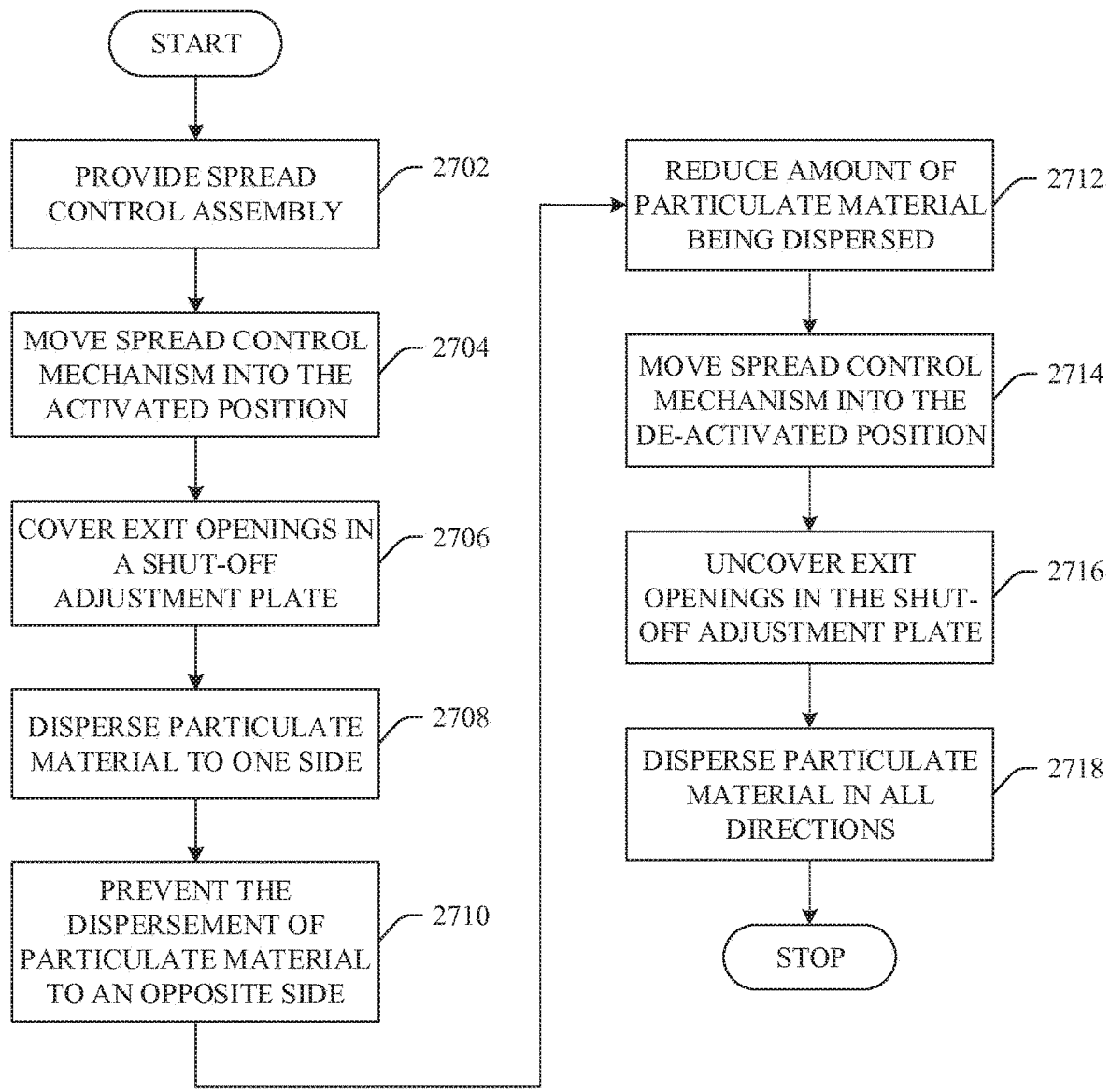
FIG. 27 is a block diagram illustration of a method of dispersing particulate material in accordance with an aspect of the innovation.

With reference now to the figures, FIGS. 1A and 1B illustrate example embodiments of a particulate material dispersing apparatus 100A, 100B that incorporates the innovative spread control assembly 200 (shown in FIG. 1A) in accordance with aspects of the innovation. It is to be understood that the particulate material dispersing apparatus 100A, 100B may be any type of particulate dispersing apparatus capable of dispersing particulate and/or granular material (hereinafter "material"), such as but not limited to lawn seed/fertilizer, salt, etc. In addition, the particulate material dispersing apparatus 100A, 100B may be a walk behind type spreader, a hand-held type spreader, a tow-type spreader, etc. The example particulate material dispersing apparatus 100A, 100B illustrated in FIGS. 1A and 1B are walk behind type spreaders and will be used to describe the innovation disclosed herein. Thus, the example particulate material dispersing apparatus 100A, 100B illustrated in FIGS. 1A and 1B are for illustration purposes only and are not intended to limit the scope of the innovation.

Still referring to FIGS. 1A and 1B, the example particulate material dispersing apparatus 100A, 100B, includes a frame 102A, 100B, a vessel or hopper 104A, 104B, mounted to the frame 102A, 102B, a push handle 106A, 106B mounted to the frame 102A, 102B, an open-close/adjustment (shut-off) assembly 108A, 108B, a pair of wheels 110A, 110B, a dispersing mechanism 112A, 112B disposed below the innovative spread control assembly and configured to disperse product from inside the hopper 104A 104B, and a gear box 114A, 114B operatively connecting the wheels 110A, 110B, and the dispersing mechanism 112A, 112B via an axle 116A, 116B, and a gear/impeller shaft 118A (best shown in FIG. 1A).

Figure 28:
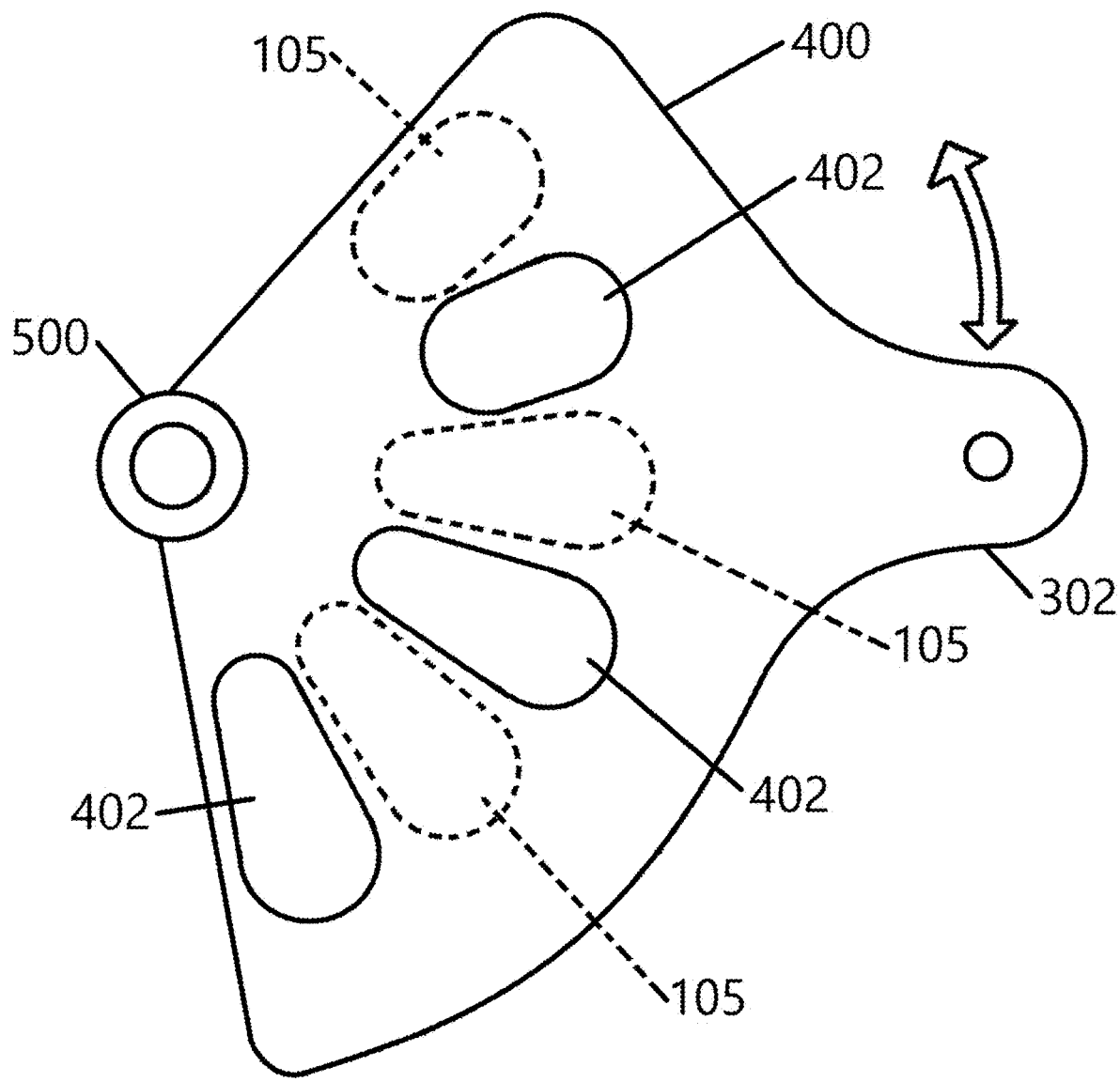
FIG. 28 is a bottom view of the shut-off adjustment plate of FIG. 2 in a fully closed position in accordance with an aspect of the innovation.
Figure 29:
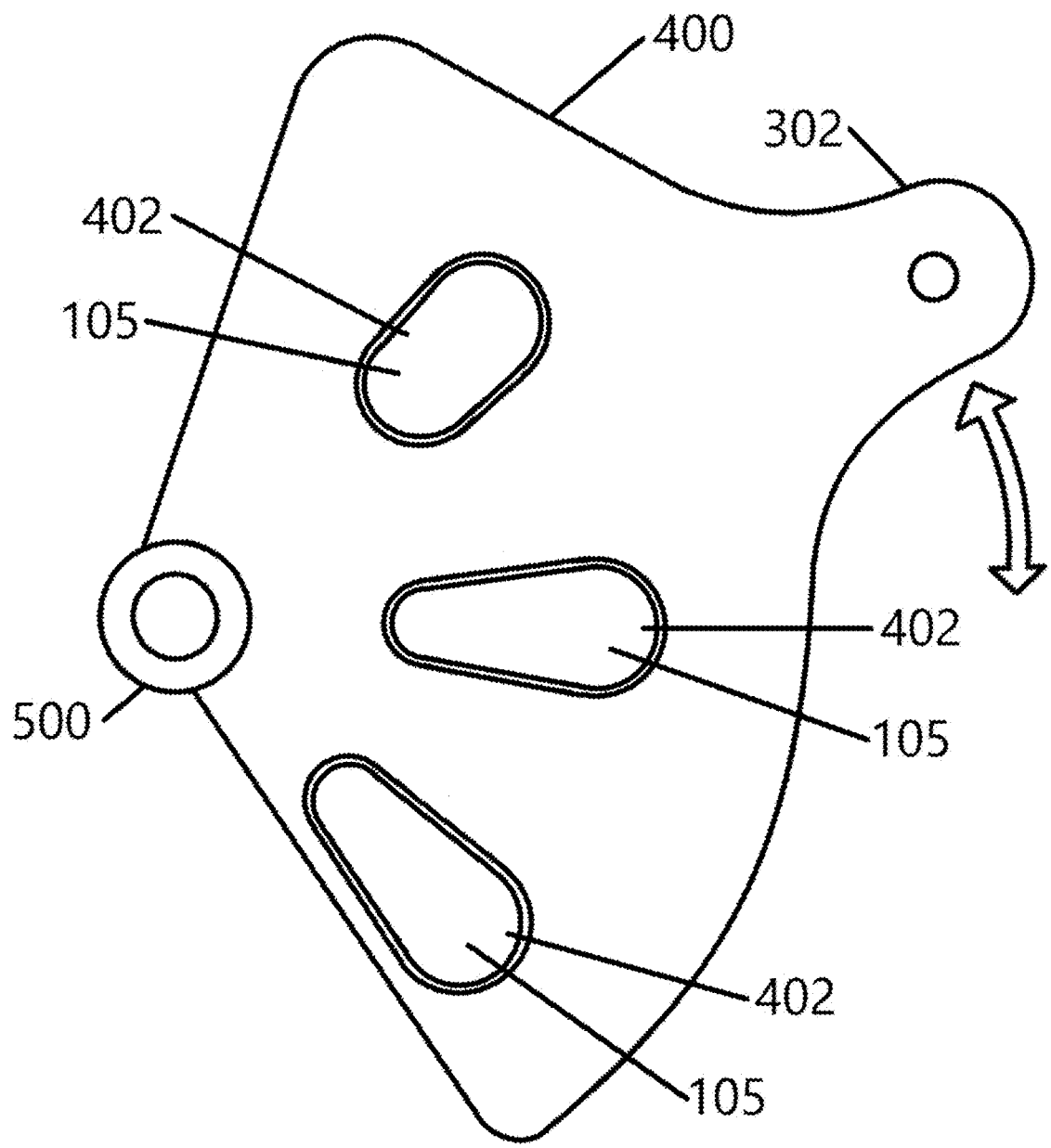
FIG. 29 is a bottom view of the shut-off adjustment plate of FIG. 2 in a fully open position in accordance with an aspect of the innovation.

In the example embodiment illustrated in the figures, the hopper 104A, 104B has a rectangular type shape, as viewed from the top, but it is understood that the shape of the hopper 104A, 104B can be any shape, such as but not limited to square, circular, etc. One or more openings 105 (see FIGS. 28 and 29) are defined in a bottom of the hopper 104A, 104B that facilitates the dispersing of the particulate material in association with the innovative spread control assembly 200.

FIGS. 2-7 illustrate the innovative spread control assembly 200 in a nonactivated (open) state in accordance with an aspect of the innovation. In the nonactivated state, the spread control assembly 200 allows the dispersion of material in all directions, as will be explained further below. FIGS. 8-13 illustrate the spread control assembly 200 in an activated (closed) state in accordance with an aspect of the innovation. In the activated state, the spread control assembly 200 impedes the dispersion of material in one side direction and allows the dispersion of material in an opposite side direction while simultaneously reducing the material flow rate.

Thus, the spread control assembly 200 is configured to alter a material spread pattern of the particulate material dispersing apparatus 100A, 100B. More specifically, the spread control assembly 200, when activated, impedes material from being dispersed through one or more exit openings defined in a shut-off adjustment plate explained further below. Therefore, a reduced amount of material is dispersed through only those remaining exit openings not covered by a spread control mechanism thereby eliminating product overuse and waste.

In addition, activation of the spread control assembly 200 causes the material to be dispersed outward from one side of the particulate material dispersing apparatus 100A, 100B while impeding material from being dispersed out an opposite side of the particulate material dispersing apparatus 100A, 100B. Thus, any material dispersed in the altered-spread pattern is impeded from spreading onto non-lawn areas, such as landscape beds, driveways, walkways, etc. It is to be understood that the spread control assembly 200 can be configured to impede material dispersion from either side of the dispersing apparatus 100A, 100B. Thus in one example embodiment, the material may be dispersed from a first side (e.g., left or right) and impeded from being dispersed from a second side (e.g., right of left). Therefore, the example embodiment described herein and illustrated in the figures is for illustrative purposes only and is not intended to limit the scope of the innovation.

As illustrated in FIGS. 2-13, the innovative spread control assembly 200 includes a spread control mechanism 300, a shut-off adjustment plate 400, and a pivot mechanism 500 that pivotally connects the spread control mechanism 300 and the shutoff adjustment plate 400.

Referring to FIGS. 14-19, in the example embodiment illustrated in the figures, the spread control mechanism 300 includes a handle 302, multiple paddles including a first paddle 304, a second paddle 306, and a curved pivot engagement portion 308. The curved pivot engagement portion 308 facilitates the pivoting motion of the spread control mechanism 300 about the pivot mechanism 500. The spread control mechanism 300 attaches to the shut-off adjustment plate 400 via a fastener 310 that extends through a slot 312 defined in the spread control mechanism 300. The handle 302 connects to an end 314 of the first paddle 304 that is distal from the pivot mechanism 500. The handle 302 facilitates movement of the spread control mechanism 300 between and an activated (closed) and deactivated (open) state. The spread control mechanism 300 has a V-shaped configuration whereby the first and second paddles 304, 306 are spaced to facilitate application of material.

Referring to FIGS. 20-25, the shut-off adjustment plate 400 includes the multiple exit openings 402 defined therein and multiple elongated curved openings 404 that serve as hopper attachments openings whereby the shut-off adjustment plate 400 attaches to an outside bottom of the hopper 104A, 104B. The shut-off adjustment plate 400 is movable between a fully closed position and a fully open position. In the fully closed position, the shut-off adjustment plate 400 covers one or more openings at the bottom of the hopper, thereby preventing any particulate from exiting the particulate dispersing apparatus 100A, 100B. In the fully open position, the shut-off adjustment plate 400 does not cover any openings at the bottom of the hopper, thereby allowing maximum flow of particulate to be dispersed by the particulate dispersing apparatus 100A, 100B. The shut-off adjustment plate 400 further includes a vertically projecting stop mechanism 406, a control rod attachment opening 408, multiple hold down openings 410 (FIG. 21) that receive fasteners 412 that serve to hold down the spread control mechanism 300, and a spread control mechanism guide opening 414 (FIG. 21) that receives the fastener 310 mentioned above.

There are three exit openings 402 defined in the shut-off adjustment plate 400 in the example embodiment illustrated in the figures. It is to be understood, however, that there can be any number of exit openings 402 defined in the exit plate 400. In one example embodiment, the number of exit openings 402 is at least one greater than a number of paddles 304, 306. Thus, when the spread control mechanism 300 is activated all but one exit opening 402 will be covered thereby impeding any material from exiting the covered exit openings 402. Therefore, a reduced amount of material will exit the remaining exit openings 402, which directs the material to exit one side of the particulate material dispersing apparatus 100A, 100B.

When the spread control mechanism 300 is in a nonactivated position, as shown in FIGS. 2-7, the spread control mechanism 300 is positioned such that all of the exit openings 402 are uncovered. The spread control mechanism 300 is slidably attached through the curved slot 312 via a washer head screw or other suitable device. Thus, the handle 302 may be grasped and moved, thereby urging the spread control mechanism 300 to be moved or slid along the path defined by slot 312 so as to move the spread control mechanism 300 between the activated (closed) and deactivated (open) state. The vertically projecting stop mechanism 406 impedes the spread control mechanism 300 from pivoting past the associated exit openings 402 intended for selective closure.

The pivot mechanism 500 is circular and is integrated into the shut-off adjustment plate 400. The curved pivot engagement portion 308 of the spread control mechanism 300 engages the pivot mechanism 500 to facilitate pivoting of the spread control mechanism 300 with respect to the shut-off adjustment plate 400. Thus, in order to pivot the spread control mechanism 300, the user pivots or rotates the user pivots or rotates the spread control mechanism 300 about the pivot mechanism 500 to the desired position.

Although, the spread control assembly illustrated in the figures is configured to disperse material out a particular side of the particulate dispersing apparatus, it is to be understood that in an alternate embodiment, the spread control assembly can be configured to disperse particulate material out an opposite side of the particulate dispersing apparatus.

The shut-off adjustment plate 400 is connected to the open-close/adjustment assembly 108A, 108B. When the open-close/adjustment assembly 108A, 108B is in a first position, the shut-off adjustment plate 400 is in a fully closed position (see FIG. 28). In this position, the shut-off adjustment plate 400 covers openings 105 in the bottom of the hopper 104A, 104B and hence prevents any particulate from exiting the dispersing apparatus 100A, 100B. Conversely, when the open-close/adjustment assembly 108A, 108B is in a second position, the shut-off adjustment plate 400 is in a fully open position (see FIG. 29). In this position, the shut-off adjustment plate 400 is not covering the openings 105 and hence allows a maximum flow of particulate to be dispersed by the dispersing apparatus 100 (subject to material spread pattern alteration by the spread control mechanism 300 as discussed above).

FIG. 26 illustrates an example alternate embodiment of a spread control assembly 2600 similar to the spread control assembly 200 disclosed above in accordance with an aspect of the innovation. The spread control assembly 2600 includes a spread control mechanism 2610, a shut-off adjustment plate 2620, and a pivot mechanism 2630 that pivotally connects the spread control mechanism 2610 and the shut-off adjustment plate 2620. One difference between the spread control assembly 2600 illustrated in FIG. 26 and the spread control assembly 200 illustrated above is that the spread control assembly 2600 does not include the slots 404 defined in the shut-off adjustment plate 400. All other features and functions between the two spread control assemblies 200, 2600 are similar and thus, will not be repeated.

Referring to FIG. 27, a process of dispersing particulate material will now be described in relation to the spread control assembly 200 illustrated in FIGS. 2-25 in accordance with one aspect of the innovation. At 2702, a spread control assembly 200 in a non-activated state for a particulate material dispersing apparatus is provided. At 2704, a spread control mechanism 300 is moved via the handle 302 in a direction such that the spread control assembly 200 is in an activated state. At 2706, the paddles 304, 306 cover exit openings 402 defined in the shut-off adjustment plate 400 thereby impeding particulate material from be dispersed through the covered exit openings 402. At 2708, particulate material is dispersed in a direction that corresponds to the side opposite the covered exit openings 402. Simultaneously, at 2710, particulate material is impeded from being dispersed in a direction that corresponds to the side of the covered exit openings 402. Simultaneously at 2712, an amount of dispersed particulate material is reduced thereby minimizing particulate material waste. At 2714, the spread control mechanism 300 is moved in a direction such that the spread control assembly 200 is in a de-activated position. At 2716, the paddles 304, 306 are moved such that the exit openings 402 are uncovered. At 2718, particulate material is dispersed in all directions. The process is repeated as the need arises to impede the dispersing of particulate material in a particular direction so as to impede the dispensing of particulate material on unwanted surfaces, such as driveways, walkways, landscape beds, etc.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of dispersing particulate material using a broadcast spreader having a hopper and an impeller disposed below the hopper, the method comprising:

placing the broadcast spreader in a first configuration where a first set of one or more through openings proximate a bottom portion of the hopper permit the particulate material to pass therethrough and fall onto the impeller to thereby be distributed in a first spread pattern during use of the broadcast spreader; and shifting the broadcast spreader into a second configuration where a second set of one or more through openings proximate the bottom portion of the hopper permit the particulate material to pass therethrough and fall onto the impeller to thereby be distributed in a second spread pattern during use of the broadcast spreader, shutting off flow of particulate material from the hopper to the impeller with a shut-off adjustment plate attached to an outside bottom of the hopper, wherein the shut-off adjustment plate defines a plurality of exit openings, each configured to align with at least one through opening in the first configuration and/or second configuration to allow flow of particulate material therethrough, wherein the first set of one or more through openings includes a different number of through openings than the second set of one or more through openings, wherein the first spread pattern is different than the second spread pattern.

2. The method of claim 1, wherein the shut-off adjustment plate has three of the exit openings, wherein the first set of one or more through openings includes three through openings, and wherein the second set of one or more through openings includes less than three through openings.

3. The method of claim 1, wherein the broadcast spreader further includes a plurality of moveable segments, the method further comprising:

placing the broadcast spreader in the first configuration using the plurality of moveable segments; and placing the broadcast spreader in the second configuration using the plurality of moveable segments.

4. The method of claim 3, wherein each segment of the plurality of moveable segments is disposed below the shut-off adjustment plate and above the impeller.

5. The method of claim 4, wherein the shut-off adjustment plate is configured to move with respect to the hopper between a closed position, in which the shut-off-adjustment plate obstructs any particulate material flowing from the hopper, and an open position, in which the plurality of exit openings permits particulate material to flow from the hopper, the method further comprising:
placing the broadcast spreader in the first configuration by moving the plurality of moveable segments to a deactivated position in which the plurality of moveable segments do not cover any of the plurality of exit openings in the shut-off adjustment plate thus resulting in the first set of one or more through openings when the shut-off adjustment plate is in the open position; and
placing the broadcast spreader in the second configuration by moving the plurality of moveable segments to an activated position in which the plurality of moveable segments cover one or more of the plurality of exit openings in the shut-off adjustment plate thus resulting in the second set of one or more through openings when the shut-off adjustment plate is in the open position.

6. The method of claim 5, wherein the shut-off adjustment plate has a first exit opening, a second exit opening, and a third exit opening, and wherein the plurality of moveable segments include a first segment and a second segment.

7. The method of claim 6, wherein, when both the first segment and the second segment are in the activated position, the first segment completely covers the first exit opening, the second segment completely covers the second exit opening, and the third exit opening is not obstructed by the first and second segments.

8. The method of claim 6, wherein, when both the first segment and the second segment are in the deactivated position, none of the first exit opening, the second exit opening, and the third exit opening are obstructed by the first and second segments.

9. A method of dispersing particulate material using a broadcast spreader including a hopper and an impeller configured to disperse particulate material falling thereon from the hopper, the method comprising:
operating the broadcast spreader in a first configuration by providing a first set of one or more through openings proximate a bottom portion of the hopper resulting in a first spread pattern;
operating the broadcast spreader in a second configuration by providing a second set of one or more through openings proximate a bottom portion of the hopper resulting in a second spread pattern; and
shutting off flow of particulate material from the hopper to the impeller with a shut-off adjustment plate attached to an outside bottom of the hopper,
wherein the shut-off adjustment plate defines a plurality of exit openings, each configured to align with at least one through opening in the first configuration and/or second configuration to allow flow of particulate material therethrough,
wherein a number of through openings included in the first set of one or more through openings is different than a number of through openings included in the second set of one or more through openings,
wherein the first spread pattern is different than the second spread pattern.

10. The method of claim 9, wherein the shut-off adjustment plate has exactly three of the exit openings, wherein the first set of one or more through openings includes three through openings, and wherein the second set of one or more through openings includes less than three through openings.

11. The method of claim 9, wherein the broadcast spreader further includes a plurality of moveable segments, the method further comprising:
placing the broadcast spreader in the first configuration using the plurality of moveable segments; and
placing the broadcast spreader in the second configuration using the plurality of moveable segments.

12. The method of claim 11, wherein the plurality of moveable segments are disposed below the shut-off adjustment plate and above the impeller.

13. The method of claim 12, wherein the shut-off adjustment plate is configured to move with respect to the hopper between a closed position, in which the shut-off-adjustment plate obstructs any particulate material flowing from the hopper, and an open position, in which the plurality of exit openings permits particulate material to flow from the hopper, the method further comprising:
placing the broadcast spreader in the first configuration by moving the plurality of moveable segments to a deactivated position in which the plurality of moveable segments do not cover any of the plurality of exit openings in the shut-off adjustment plate thus resulting in the first set of one or more through openings when the shut-off adjustment plate is in the open position; and
placing the broadcast spreader in the second configuration by moving the plurality of moveable segments to an activated position in which the plurality of moveable segments cover one or more of the plurality of exit openings in the shut-off adjustment plate thus resulting in the second set of one or more through openings when the shut-off adjustment plate is in the open position.

14. The method of claim 13, wherein the shut-off adjustment plate has a first exit opening, a second exit opening, and a third exit opening, and wherein the plurality of moveable segments include a first segment and a second segment.

15. The method of claim 14, wherein, when both the first segment and the second segment are in the activated position, the first segment completely covers the first exit opening, the second segment completely covers the second exit opening, and the third exit opening is not obstructed by the first and second segments.

16. The method of claim 14, wherein, when both the first segment and the second segment are in the deactivated position, none of the first exit opening, the second exit opening, and the third exit opening are obstructed by the first and second segments.

17. A broadcast spreader configured to operate in multiple configurations thereby providing multiple spread patterns, the broadcast spreader comprising:
an impeller;
a hopper disposed above the impeller and configured to drop particulate material onto the impeller; and
a shut-off adjustment plate disposed below the hopper and above the impeller and configured to selectively shut off flow of particulate material from the hopper to the impeller, wherein the shut-off adjustment plate comprises a plurality of exit openings through which the particulate material can drop from the hopper to the impeller, wherein, when the broadcast spreader is in a first configuration, the broadcast spreader includes a first set of one or more through openings proximate a bottom portion of the hopper such that, during use of the broadcast spreader in the first configuration, the particulate material is configured to pass through the first set of one or more through openings and fall onto the impeller to thereby be distributed in a first spread pattern, wherein each of the plurality of exit openings is configured to align with at least one through opening in the first configuration and/or second configuration to allow flow of particulate material therethrough, wherein, when the broadcast spreader is in a second configuration, the broadcast spreader includes a second set of one or more through openings proximate the bottom portion of the hopper such that, during use of the broadcast spreader in the second configuration, the particulate material is configured to pass through the second set of one or more through openings and fall onto the impeller to thereby be distributed in a second spread pattern, wherein the first set of one or more through openings includes a different number of openings than the second set of one or more through openings, and wherein the first spread pattern is different than the second spread pattern.

18. The broadcast spreader of claim 17 further comprising a plurality of moveable segments configured to switch the broadcast spreader between the first configuration and the second configuration.

19. The broadcast spreader of claim 18, wherein the plurality of moveable segments are disposed below the shut-off adjustment plate and above the impeller.

20. The broadcast spreader of claim 19, wherein the shut-off adjustment plate is configured to move with respect to the hopper between a closed position, in which the shut-off-adjustment plate obstructs any particulate material flowing from the hopper, to an open position, in which the plurality of exit openings permits particulate material to flow from the hopper, and wherein the plurality of moveable segments are configured to move between a deactivated position, in which the plurality of moveable segments do not cover any of the plurality of exit openings in the shut-off adjustment plate thus permitting particulate material to flow therefrom, and an activated position, in which the plurality of moveable segments cover one or more of the plurality of exit openings in the shut-off adjustment plate thus obstructing particulate material from flowing therefrom.

21. A particulate material dispersing apparatus comprising:
a hopper including one or more through openings proximate a bottom of the hopper;
a shut-off adjustment plate disposed below the one or more through openings and including a plurality of exit openings, the shut-off adjustment plate being moveable with respect to the hopper between a fully closed position, in which the shut-off adjustment plate completely covers the one or more through openings in the hopper and obstructs any particulate material from flowing therefrom, to a fully open position, in which the plurality of exit openings align with the one or more through openings in the hopper thus permitting particulate material to flow therefrom; and a plurality of segments disposed below the shut-off adjustment plate, the plurality of segments being movable between a deactivated position, in which the plurality of segments do not cover any of the plurality of exit openings in the shut-off adjustment plate thus permitting particulate material to flow therefrom, and an activated position, in which the plurality of segments at least partially cover the plurality of the exit openings in the shut-off adjustment plate thus obstructing particulate material from flowing therefrom, wherein each of the plurality of exit openings is configured to align with at least one through opening when the plurality of segments are in the deactivated position and/or activated position to allow flow of particulate material therethrough.

22. The particulate material dispersing apparatus of claim 21,
wherein the shut-off adjustment plate has a first exit opening, a second exit opening, and a third exit opening,
wherein the plurality of segments includes a first segment and a second segment,
wherein, when the plurality of segments are in the activated state and the shut-off adjustment plate is in the fully open position, the first segment completely covers the first exit opening, the second segment completely covers the second exit opening, and the third exit opening is not obstructed by the plurality of segments, and
wherein, when the plurality of segments are in the deactivated state and the shut-off adjustment plate is in the fully open position, none of the first exit opening, the second exit opening, and the third exit opening are obstructed by the plurality of segments.

23. The particulate material dispersing apparatus of claim 21 further comprising a handle coupled to an end of a first segment of the plurality of segments.

24. The particulate material dispersing apparatus of claim 23, wherein the handle is configured to selectively move the first segment between the deactivated position and the activated position.

25. The particulate material dispersing apparatus of claim 24, wherein the handle is further configured to selectively move a second segment of the plurality of segments between the deactivated position and the activated position.

26. The particulate material dispersing apparatus of claim 21, wherein when the plurality of segments are in the deactivated position, the particulate material dispersing apparatus is configured to spread particulate material in a first pattern about a surface, wherein when the plurality of segments are in the activated position, the particulate material dispersing apparatus is configured to spread particulate material in a second pattern about the surface, and wherein the second pattern is different than the first pattern.

27. The particulate material dispersing apparatus of claim 21, wherein the plurality of segments includes a first segment and a second segment, and wherein the first segment and the second segment are arranged in a V-shaped configuration.

* * * * *